(12) United States Patent
Ishikawa et al.

(10) Patent No.: US 10,224,555 B2
(45) Date of Patent: Mar. 5, 2019

(54) FUEL CELL

(71) Applicant: NGK SPARK PLUG CO., LTD., Nagoya-shi, Aichi (JP)

(72) Inventors: Hideki Ishikawa, Ichinomiya (JP); Hideki Uematsu, Konan (JP); Hiroya Ishikawa, Aichi (JP); Takeshi Ohno, Komaki (JP); Takafumi Shichida, Kasugai (JP); Shunsuke Tsuga, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 328 days.

(21) Appl. No.: 14/355,766

(22) PCT Filed: Oct. 31, 2012

(86) PCT No.: PCT/JP2012/078219
§ 371 (c)(1),
(2) Date: May 1, 2014

(87) PCT Pub. No.: WO2013/065757
PCT Pub. Date: May 10, 2013

(65) Prior Publication Data
US 2015/0030949 A1  Jan. 29, 2015

(30) Foreign Application Priority Data
Nov. 2, 2011  (JP) ................................. 2011-241384

(51) Int. Cl.
*H01M 8/04007* (2016.01)
*H01M 8/0258* (2016.01)
(Continued)

(52) U.S. Cl.
CPC ...... *H01M 8/04007* (2013.01); *F28D 9/0075* (2013.01); *F28F 3/048* (2013.01);
(Continued)

(58) Field of Classification Search
CPC ........... H01M 8/04007; H01M 8/2457; H01M 8/2483; H01M 8/0258; H01M 8/0267;
(Continued)

(56) References Cited

U.S. PATENT DOCUMENTS

2006/0003206 A1* 1/2006 Sugiura ............... H01M 8/0247
429/434
2008/0241620 A1* 10/2008 Ham ................... H01M 8/0267
429/514
(Continued)

FOREIGN PATENT DOCUMENTS

CN 102047482 A 5/2011
JP S61186169 U 11/1986
(Continued)

OTHER PUBLICATIONS

Communication dated Oct. 14, 2015 from the Canadian Intellectual Property Office in counterpart application No. 2,853,969.
(Continued)

*Primary Examiner* — Helen Oi K Conley
(74) *Attorney, Agent, or Firm* — Sughrue Mion, PLLC

(57) ABSTRACT

The fuel cell includes a fuel cell stack in which a plurality of planar power generation cells are stacked in a thickness direction thereof. The fuel cell also includes a heat exchanger provided between the two adjacent power generation cells in the stacking direction and in contact with the power generation cells, and including an internal first flow path that passes the oxidant gas or fuel gas supplied from outside. The fuel cell also includes a second flow path connected to an outlet side of the first flow path of the heat exchanger and to the cathode side or the anode side of each of the power generation cells, and supplying the oxidant gas or fuel gas that has passed through the first flow path to the cathode side or anode side of each of the power generation cells on both sides in the stacking direction of the heat exchanger.

29 Claims, 25 Drawing Sheets

(51) Int. Cl.
*H01M 8/241* (2016.01)
*H01M 8/2457* (2016.01)
*H01M 8/2425* (2016.01)
*H01M 8/0267* (2016.01)
*F28F 3/08* (2006.01)
*F28D 9/00* (2006.01)
*H01M 8/24* (2016.01)
*F28F 3/04* (2006.01)
*F28F 9/02* (2006.01)
*H01M 8/2483* (2016.01)
*H01M 8/124* (2016.01)
*F28D 21/00* (2006.01)

(52) U.S. Cl.
CPC .............. *F28F 3/086* (2013.01); *F28F 9/026* (2013.01); *H01M 8/0258* (2013.01); *H01M 8/0267* (2013.01); *H01M 8/04074* (2013.01); *H01M 8/24* (2013.01); *H01M 8/241* (2013.01); *H01M 8/2425* (2013.01); *H01M 8/2457* (2016.02); *H01M 8/2483* (2016.02); *F28D 2021/0043* (2013.01); *H01M 2008/1293* (2013.01)

(58) Field of Classification Search
CPC .... H01M 8/04074; H01M 8/24; H01M 8/241; H01M 8/2425; F28D 9/0075; F28F 3/048; F28F 3/086; F28F 9/026
See application file for complete search history.

(56) References Cited

U.S. PATENT DOCUMENTS

| | | | |
|---|---|---|---|
| 2009/0239121 A1 | 9/2009 | Ono | |
| 2011/0039179 A1 | 2/2011 | Suh et al. | |
| 2011/0070507 A1 | 3/2011 | He et al. | |
| 2011/0247790 A1* | 10/2011 | Holm | F28D 9/005 165/168 |

FOREIGN PATENT DOCUMENTS

| | | | |
|---|---|---|---|
| JP | H01163973 A | 6/1989 | |
| JP | H04181657 A | 6/1992 | |
| JP | 2005-005074 A | 1/2005 | |
| JP | 2008-108722 A | 5/2008 | |
| JP | 2008-159362 A | 7/2008 | |
| JP | 2011522376 A | 7/2011 | |
| KR | 10-2008-0086701 A | 9/2008 | |
| KR | 10-2011-0018222 A | 2/2011 | |

OTHER PUBLICATIONS

Communication dated Apr. 7, 2015 from the European Patent Office in counterpart application No. 12846451.8.
International Preliminary Report on Patentability dated Jun. 3, 2014, issued by the International Searching Authority in corresponding International Application No. PCT/JP2012/078219.
International Search Report dated Jan. 15, 2013, issued by the International Searching Authority in corresponding International Application No. PCT/JP2012/078219.
Communication dated Oct. 12, 2015 from the Korean Industrial Property Office issued in Korean application No. 10-2014-7013405.
Communication dated Sep. 6, 2015 from the State Intellectual Property Office of the People's Republic of China issued in corresponding Chinese application No. 201280054113.9.
Communication dated Mar. 2, 2017 from the European Patent Office issued in counterpart European Patent Application No. 12 846 451.8.
Communication dated Jan. 30, 2018 from the European Patent Office in counterpart European application No. 12846451.8.
Communication dated Sep. 21, 2018 from the European Patent Application in counterpart Application No. 12 846 451.8.
Communication dated May 8, 2018 from the European Patent Office in counterpart European Application No. 12 846 451.8.

* cited by examiner

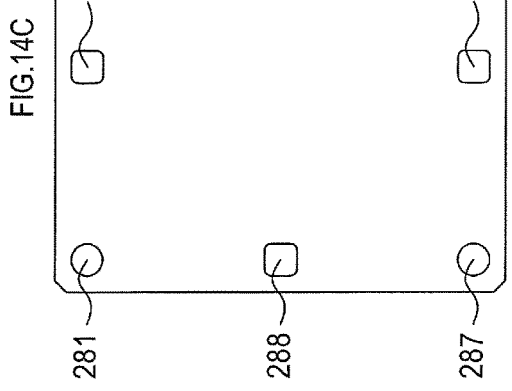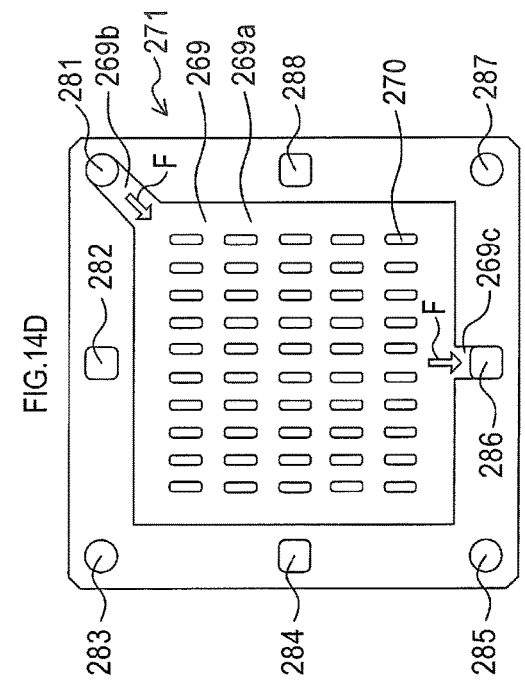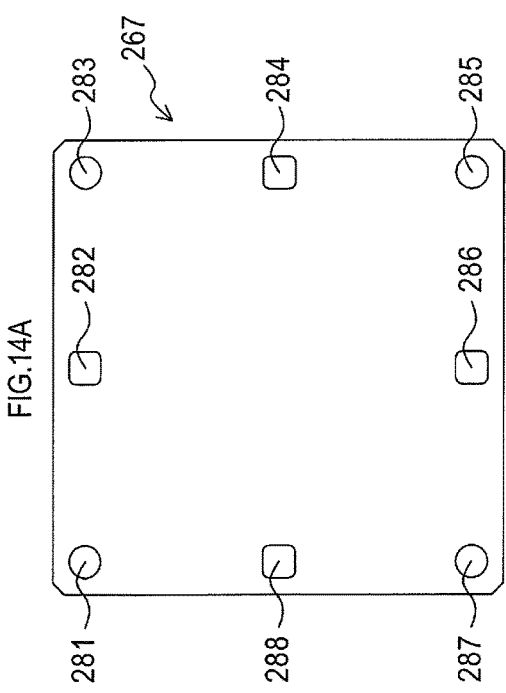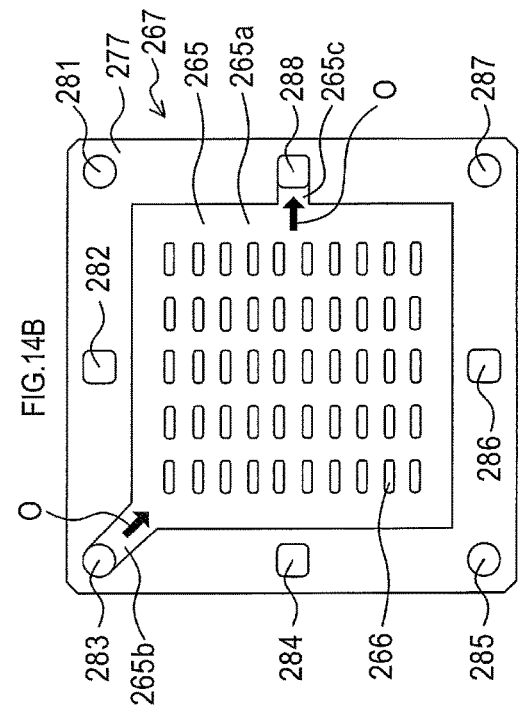

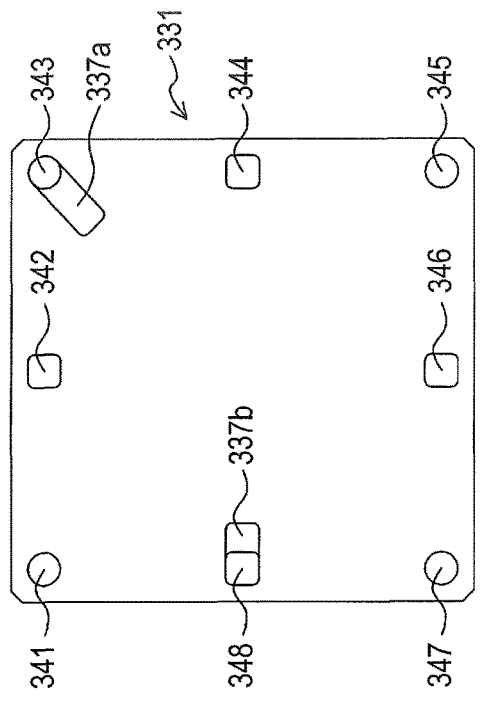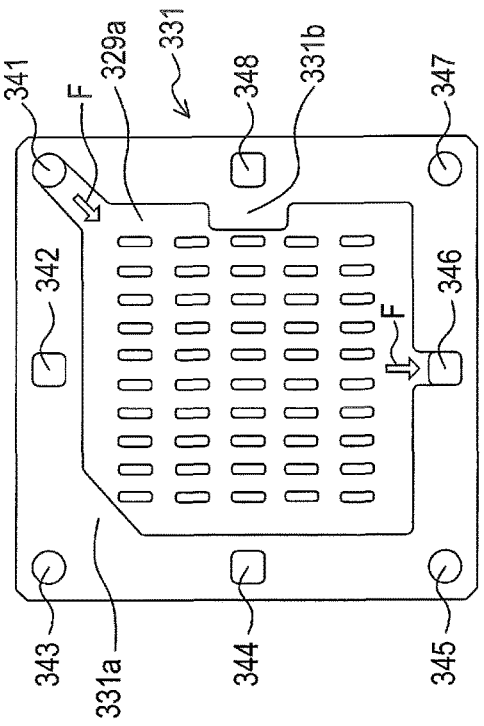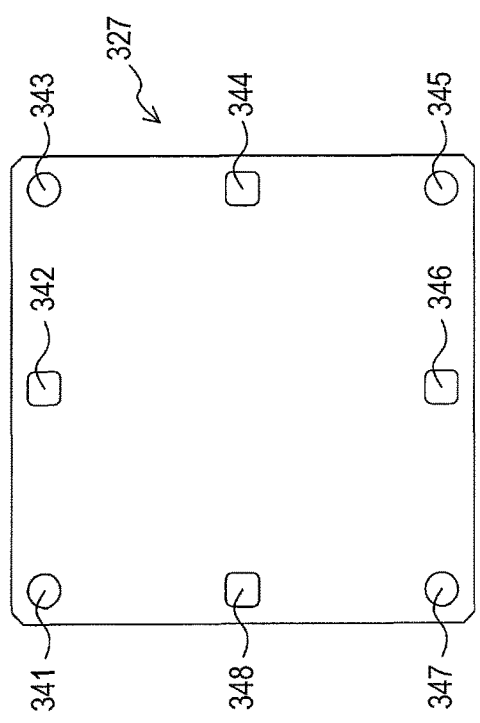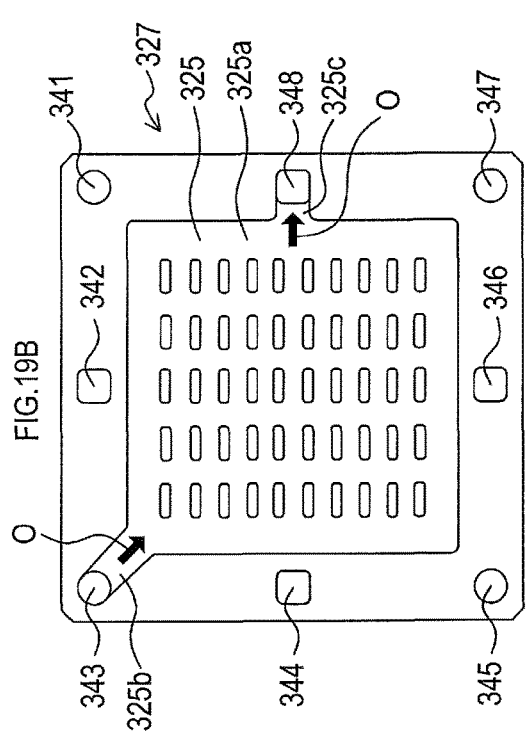

FIG.24A
FIG.24B
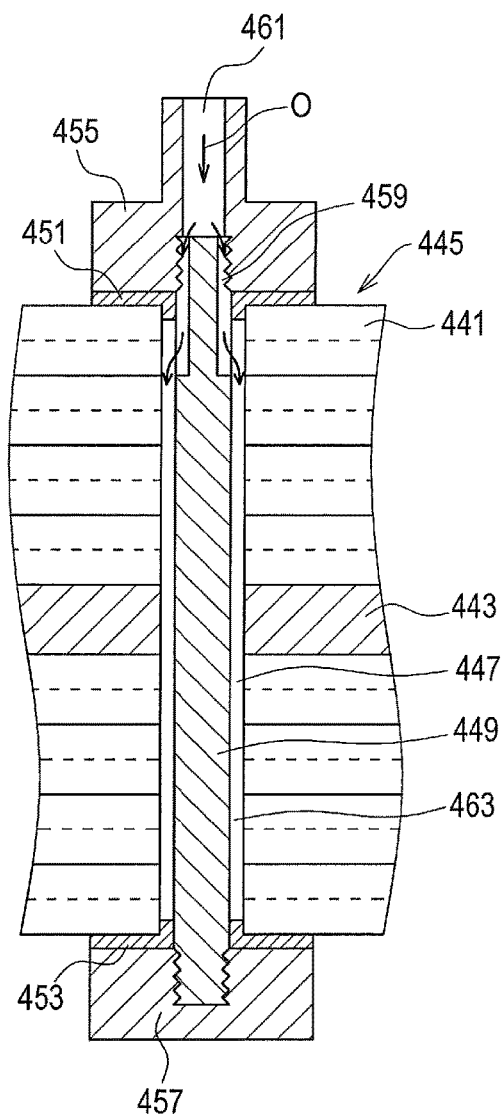
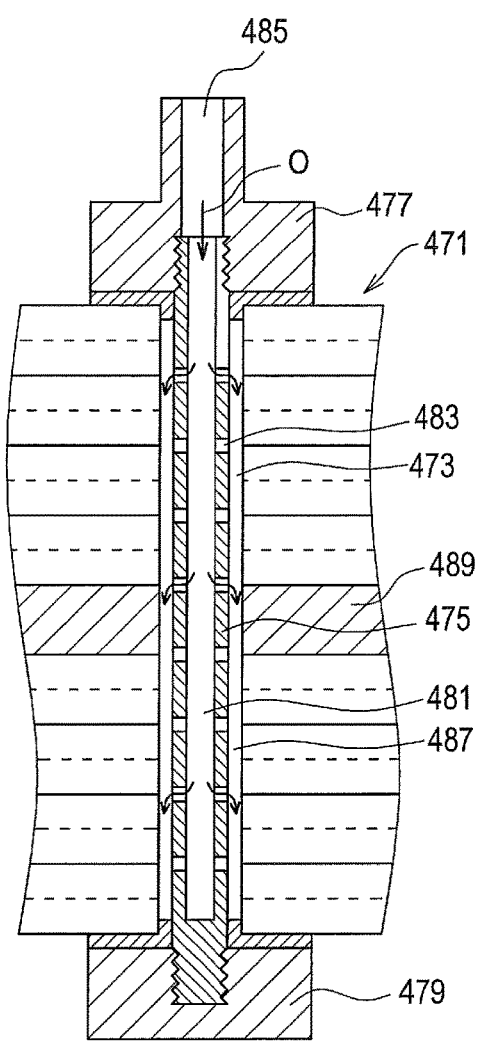

FUEL CELL

CROSS REFERENCE TO RELATED APPLICATIONS

This application is a National Stage of International Application No. PCT/JP2012/078219 filed Oct. 31, 2012, claiming priority based on Japanese Patent Application No. 2011-241384, filed Nov. 2, 2011, the contents of all of which are incorporated herein by reference in their entirety.

TECHNICAL FIELD

The present invention relates to a fuel cell such as a solid oxide fuel cell having a fuel cell stack that includes plate-like power generation cells, each having an electrolyte layer, a cathode, and an anode, which are stacked in a thickness direction of the power generation cells.

BACKGROUND ART

Conventionally, a solid oxide fuel cell (hereinafter, also referred to as SOFC) using a solid electrolyte (solid oxide) is known as a fuel cell.

In the SOFC, a fuel battery cell (power generation cell) is used as a power generation unit. In the fuel battery cell, for example, an anode in contact with fuel gas is provided on one side of a solid electrolyte layer, and an oxidant electrode (cathode) in contact with oxidant gas (air) is provided on the other side of the solid electrolyte layer. Further, in order to obtain a desired voltage, a stack (fuel cell stack) has been developed which includes a plurality of power generation cells that are stacked via inter-connectors.

Usually, in the fuel cell stack of this type, power generation cells close to the middle section of the fuel cell stack have a higher temperature than power generation cells at end sections of the fuel cell stack in a direction in which the power generation cells are stacked (stacking direction). There is a problem in that temperature distribution in the stacking direction of the fuel cell stack is not uniform.

Therefore, in recent years, as described in Patent Document 1, in order to equalize temperature distribution in the stacking direction of the fuel cell stack and to increase power generation efficiency, a technique has been proposed in which cool air is supplied to one side of a center portion of the fuel cell stack (one side of a direction orthogonal to the stacking direction), and heat exchanged hot gas is supplied to end portions in the stacking direction of the fuel cell stack.

RELATED ART DOCUMENTS

Patent Documents

Patent Document 1: Japanese Unexamined Patent Application Publication No. 2005-005074

SUMMARY OF THE INVENTION

Problems to be Solved by the Invention

However, because the prior art described above is configured to apply cool air to one side of the fuel cell stack, there is a problem in that the temperature is lowered on a side exposed to cool air, but the temperature in the stacking direction of the fuel cell stack cannot be equalized.

In addition, in the above prior art, apart from supply of cool air, hot gas is supplied to the end portions in the stacking direction of the fuel cell stack to increase the temperature at end sides in the stacking direction. However, there is a problem in that it is not possible to cool a center portion of the fuel cell stack where the temperature is easy to increase.

In one aspect of the present invention, it is desirable to provide a fuel cell in which the temperature in the center in the stacking direction of the fuel cell stack is efficiently lowered, and the temperature in the stacking direction of the fuel cell stack is equalized so as to allow increase in power generation efficiency.

Means for Solving the Problems (1) The fuel cell according to a first aspect of the present invention includes a fuel cell stack in which a plurality of planar power generation cells are stacked in a thickness direction of the power generation cell. Each of the plurality of planar power generation cells includes an electrolyte layer, and a cathode and an anode disposed so as to sandwich the electrolyte layer therebetween, and generates electric power using oxidant gas and fuel gas. The fuel cell further includes a heat exchanger provided between the two adjacent power generation cells in the stacking direction and in contact with the power generation cells. The heat exchanger includes a first flow path that passes the oxidant gas or fuel gas supplied from outside. The fuel cell further includes a second flow path. The second flow path is connected to an outlet side of the first flow path in the heat exchanger and to the cathode side or the anode side of each of the power generation cells. The second flow path supplies the oxidant gas or the fuel gas that has passed through the first flow path to the cathode side or the anode side of each of the power generation cells on both sides in the stacking direction of the heat exchanger.

In the invention according to the first aspect, the heat exchanger is provided midway in the stacking direction of the power generation cells that constitute the fuel cell stack. The heat exchanger includes the first flow path which passes the oxidant gas or fuel gas supplied from outside. In addition, to the outlet side of the first flow path, the second flow path that supplies the oxidant gas or fuel gas discharged from the first flow path to the power generation cells arranged in the stacking direction (i.e., arranged in outer sides in the stacking direction with respect to the heat exchanger) is connected.

Accordingly, in the invention according to the first aspect, when gas (oxidant gas or fuel gas) cooler than a center portion of the fuel cell stack (i.e., power generation cells adjacent to the heat exchanger) is supplied to the first flow path in the heat exchanger from outside, a temperature of the gas is raised due to heat exchange with the adjacent power generation cells, and a temperature of the adjacent power generation cells is lowered. The gas of which temperature has been raised by heat exchange is supplied to the power generation cells located in the stacking direction (i.e., located on the outer sides (end sides)). Thus, in the power generation cells to which the gas is supplied, the temperature is raised due to the gas. As a result, since the temperature to a center in the stacking direction of the fuel cell stack is lowered and the temperature of the end sides is raised, the temperature in the stacking direction is equalized.

That is, as described above, in the fuel cell stack, the temperature in the center in the stacking direction of the power generation cells is higher than the temperature at the end sides. In the invention according to the first aspect, since heat exchange with gas from outside is performed by the heat exchanger arranged in the center, the temperature of the power generation cells, etc. in the center can be efficiently reduced. Also, the temperature of the end sides can be raised by supplying the heat-exchanged gas to the power generation cells of the end sides. Thereby, the temperature in the stacking direction of the fuel cell stack is equalized. There is remarkable effect of improved power generation efficiency.

Further, in the invention according to the first aspect, the gas supplied from outside is heated by the heat exchanger. Therefore, there is an advantage that a device or the like for heating the gas in advance can be simplified or eliminated.

Normally, in fuel cells, more oxidant gas is supplied than fuel gas. Thus, especially by using a heat exchanger having a first flow path of oxidant gas, effect such as of above described uniform temperature and improved power generation efficiency is all the more pronounced.

(2) A fuel cell according to a second aspect of the present invention includes a fuel cell stack in which a plurality of planar power generation cells are stacked in a thickness direction of the power generation cell. Each of the plurality of planar power generation cells includes an electrolyte layer, and a cathode and an anode disposed so as to sandwich the electrolyte layer therebetween, and generates electric power using oxidant gas and fuel gas. The fuel cell further includes a heat exchanger provided between the two adjacent power generation cells in the stacking direction and in contact with the power generation cells. The heat exchanger includes a first flow path for oxidant gas that passes the oxidant gas supplied from outside and a first flow path for fuel gas that passes fuel gas supplied from the outside. The fuel cell further includes a second flow path for oxidant gas, and a second flow path for fuel gas. The second flow path for oxidant gas is connected to an outlet side of the first flow path for oxidant gas of the heat exchanger and to the cathode side of each of the power generation cells. The second flow path for oxidant gas supplies the oxidant gas that has passed through the first flow path for oxidant gas to the cathode side of each of the power generation cells on both sides in the stacking direction of the heat exchanger. The second flow path for fuel gas is connected to an outlet side of the first flow path for fuel gas of the heat exchanger and to the anode side of each of the power generation cells. The second flow path for fuel gas supplies the fuel gas that has passed through the first flow path for fuel gas to the anode side of each of the power generation cells on both sides in the stacking direction of the heat exchanger.

In the invention according to the second aspect, the heat exchanger is provided midway in the stacking direction of the power generation cells constituting the fuel cell stack. The heat exchanger includes the first flow path for oxidant gas and the first flow path for fuel gas which respectively pass the oxidant gas and the fuel gas supplied from outside. In addition, to the outlet side of the first flow paths, the second flow path for oxidant gas and the second flow path for fuel gas that respectively supply the oxidant gas and fuel gas discharged from the first flow paths to the power generation cells arranged in the stacking direction (i.e., arranged in outer sides in the stacking direction with respect to the heat exchanger) are connected.

It should be noted that the flow path for oxidant gas and the flow path for fuel gas are flow paths different from each other (flow paths divided by types of gas).

Accordingly, in the invention according to the second aspect, when both gases (oxidant gas and fuel gas) cooler than a center portion of the fuel cell stack (i.e., power generation cells adjacent to the heat exchanger) are supplied to the first flow paths in the heat exchanger from outside, a temperature of the gases is raised due to heat exchange with the adjacent power generation cells, and a temperature of the adjacent power generation cells is lowered. The gas of which temperature has been raised by heat exchange is supplied to the power generation cells located in the stacking direction (i.e., located on the outer sides (end sides)). Thus, in the power generation cells to which the gas is supplied, the temperature is raised due to the gases. As a result, since the temperature in the center in the stacking direction of the fuel cell stack is lowered and the temperature of the end sides is raised, the temperature in the stacking direction is equalized.

That is, as described above, in the fuel cell stack, the temperature in the center in the stacking direction of the power generation cells is higher than the temperature of the end sides. In the invention according to the second aspect, since heat exchange with gases from outside is performed by the heat exchanger arranged in the center, the temperature of the power generation cells, etc. in the center can be more efficiently reduced (as compared with a case of performing heat exchange of one of the gases). Also, the temperature of the end sides can be raised by supplying the heat-exchanged gases to the power generation cells of the end sides. Thereby, the temperature in the stacking direction of the fuel cell stack is all the more equalized. There is remarkable effect of greatly improved power generation efficiency.

Further, in the second aspect of the invention, both the oxidant gas and the fuel gas supplied from outside are heated by the heat exchanger. Therefore, there is an advantage that a device or the like for heating the oxidant gas and the fuel gas in advance (preheating) can be simplified or eliminated.

(3) In the fuel cell according to a third aspect of the present invention, the first flow path formed in an interior of the heat exchanger is formed so as to extend in a surface direction of the planar power generation cell.

In the invention according to the third aspect, since the first flow path inside the heat exchanger is formed so as to extend in the surface direction of the power generation cell, there is an advantage of excellent heat exchange efficiency.

(4) In the fuel cell according to a fourth aspect of the present invention, the first flow path of the heat exchanger is constituted by a groove formed on a surface of a plate-shaped member.

In the invention according to the fourth aspect, the first flow path in the heat exchanger is formed by a groove on the surface. Thus, a structure of the first flow path can be simplified, and there is an advantage of easy manufacturing.

(5) In the fuel cell according to a fifth aspect of the present invention, the heat exchanger is arranged in a center portion of the fuel cell stack in the stacking direction.

In the invention according to the fifth aspect, the heat exchanger is arranged in the center portion of the fuel cell stack in the stacking direction. Thus, the center having the high temperature can be efficiently cooled.

Here, for example, the center portion is in a range of ⅓ in the center if the fuel cell stack in the stacking direction is divided into three.

(6) In the fuel cell according to a sixth aspect of the present invention, two or more heat exchangers are provided in different positions in the stacking direction.

In the invention according to the sixth aspect, the heat exchanger is provided in two or more different positions in the stacking direction. Thus, heat exchange of gas can be performed in the respective heat exchangers. Therefore, temperature distribution in the stacking direction can be all the more equalized.

As the heat exchanger arranged at different locations, a heat exchanger provided with first flow paths for both oxidant gas and fuel gas, for example, may be disposed at different locations, or a heat exchanger (for oxidant gas) provided with a first flow path for oxidant gas and a heat exchanger (for fuel gas) provided with a first flow path for fuel gas, for example, may be disposed at different locations.

(7) In the fuel cell according to a seventh aspect of the present invention, the first flow path of the heat exchanger has a pressure loss structure that regulates an outflow state of at least one of the oxidant gas and the fuel gas.

In the invention according to the seventh aspect, because the first flow path is configured to have a pressure loss structure (a structure in which a flow path is smaller on an outlet side), pressure in the first flow path can be increased. Thereby, since the fuel cell stack can be depressed in the stacking direction, the power generation cells can be made to strongly adhere to each other. Thus, thermal conductivity and electrical connection between the power generation cells can be improved.

(8) In the fuel cell according to an eighth aspect of the present invention, an inlet and an outlet of the first flow path where at least one of the oxidant gas and the fuel gas flows are formed in farthest positions from each other or in vicinity of the farthest positions, when the first flow path is viewed from the stacking direction.

In the invention according to the eighth aspect, because the inlet side and the outlet side of the gas in the first flow path are formed in the farthest positions or in vicinity of the farthest positions, a flow path where heat exchange of gas is carried out is long. There is an advantage that heat exchange can be performed efficiently.

Here, as an example of "vicinity", a flow path (an insertion hole adjacent to an insertion hole formed in the stacking direction, for example) formed in a position closest to a flow path in the farthest position (the insertion hole formed in the stacking direction).

(9) In the fuel cell according to a ninth aspect of the present invention, the heat exchanger is constituted by a plate-shaped member for oxidant gas that includes a first groove that is the first flow path for oxidant gas, and a plate-shaped member for fuel gas that includes a second groove that is the first flow path for fuel gas. The member for oxidant gas and the member for fuel gas are stacked in the stacking direction.

In the invention according to the ninth aspect, the first groove that flows oxidant gas and the second groove that flows fuel gas are formed in the heat exchanger. Thus, the oxidant gas and the fuel gas can be simultaneously heated by heat exchange. Thereby, the temperature in the center in the fuel cell stack can be lowered more efficiently. Also, supply of the oxidant gas and the fuel gas of which temperature has been raised by heat exchange to the end sides having the low temperature can raise the temperature of the end sides. As a result, the temperature in the stacking direction of the fuel cell stack is all the more equalized. There is significant effect of further improved power generation efficiency.

In the invention according to the ninth aspect as well, both the oxidant gas and the fuel gas supplied from outside are heated by the heat exchanger. Therefore, there is an advantage that a device or the like for heating the oxidant gas and the fuel gas in advance (preheating) can be simplified or eliminated.

(10) In the fuel cell according to a tenth aspect the present invention, the first groove of the member for oxidant gas is open to one side (an upper side, for example) in the stacking direction, and the second groove of the member for fuel gas is formed so as to open to the other side (opposite to the one side, for example, a lower side) in the stacking direction.

The invention according to the tenth aspect shows an example of arrangement of the first groove and the second groove.

(11) In the fuel cell according to an eleventh aspect the present invention, both the first groove of the member for oxidant gas and the second groove of the member for fuel gas are formed so as to open to one side (for example, open only to an upper side, or to a lower side) in the stacking direction.

The invention according to the eleventh aspect shows an example of arrangement of the first groove and the second groove.

(12) In the fuel cell according to a twelfth aspect of the present invention, the member for fuel gas is stacked on a side having the first groove of the member for oxidant gas, and a third groove that communicates with the first groove of the member for oxidant gas is formed on the member for oxidant gas side of the member for fuel gas.

In the invention according to the twelfth aspect, the third groove that communicates with the first groove of the member for oxidant gas is formed on an upper side of the member for fuel gas. Thus, it is possible to have a large flow path for oxidant gas. That is, in the invention according to the twelfth aspect, remarkable effect is produced in which a thickness of the heat exchanger is reduced, while a depth of the flow path for oxidant gas is maintained.

(13) In the fuel cell according to a thirteenth aspect of the present invention, the heat exchanger has the first groove for oxidant gas on one side (an upper side, for example) in the stacking direction of a plate-shaped member, and the second groove for fuel gas on the other side (opposite to the one side, for example, a lower side) in the stacking direction of the plate-shaped member.

In the invention according to the thirteenth aspect, the first groove and the second groove are formed on both sides of the plate. Thus, there is an advantage that the heat exchanger can be compact (thin). As a result, because heat capacity of the heat exchanger (and therefore of the fuel cell) can be reduced, significant effect is produced in which starting is improved and costs are reduced.

(14) In the fuel cell according to a fourteenth aspect of the present invention, at least a portion of the second flow path is constituted by a flow path formed so as to extend in the stacking direction inside the fuel cell stack.

In the invention according to the fourteenth aspect, at least a portion of the second flow path is formed so as to extend in the stacking direction inside the fuel cell stack. Thus, a shape of the fuel cell stack can be made compact (space saving).

(15) In the fuel cell according to a fifteenth aspect of the present invention, the fuel cell stack has an insertion hole that penetrates the fuel cell stack in its thickness direction, an insertion member is inserted to the insertion hole, and at least a portion of the second flow path is formed between an inner peripheral surface of the insertion hole and an outer peripheral surface of the insertion member.

In the invention according to the fifteenth aspect, a space between the insertion hole and the insertion member can be the second flow path. Using the second flow path, the gas can flow in a predetermined direction. Thus, a configuration of a gas flow path can be simplified. The fuel cell stack can be compact.

A restraining member such as, for example, a bolt which binds the fuel cell stack by depression in the stacking direction can be used as the insertion member.

(16) In the fuel cell of a sixteenth aspect of the present invention, the fuel cell stack has an insertion member that penetrates the fuel cell stack in its thickness direction, and at least a portion of the second flow path is formed in an interior of the insertion member.

In the invention according to the sixteenth aspect, the second flow path is formed in the interior of the insertion member (in its axial direction or radial direction, for example). Thus, gas can flow in a predetermined direction using the insertion member. A configuration of a gas flow path can be simplified. The fuel cell stack can be compact.

A restraining member such as, for example, a bolt which binds the fuel cell stack by depression in the stacking direction can be used as the insertion member.

In addition, a configuration as below can be also employed as a fuel cell of another aspect of the present invention.

The second flow path may be configured so that at least one of the oxidant gas and the fuel gas that passes the first flow path is supplied in sequence through the farther power generation cell to the closer power generation cell with respect to the heat exchanger in the stacking direction.

In this configuration, gas that has passed the first flow path (heated by heat exchange) is supplied in sequence to the center from the power generation cell at the end side (of which is lower as compared with the temperature in the center). In other words, since the power generation cell having the lowest temperature is effectively heated by the gas having the highest temperature, remarkable effect is produced in which temperature distribution is all the more equalized.

If one of the gases is oxidant gas, at least a portion of the second flow path may be configured by a bowl-shaped member so as to cover an outlet side of the first flow path of the heat exchanger and an inlet side through which oxidant gas is introduced to the cathode side of each power generation cell, from a direction that intersects the stacking direction.

In this configuration, a flow path that is configured to cover an outside of the fuel cell stack with the bowl-shaped member is used as the second flow path of oxidant gas. Thus, there is an advantage that an internal structure of the fuel cell stack can be simplified.

If one of the gases is fuel gas, at least a portion of the second flow path may be configured by a bowl-shaped member so as to cover an outlet side of the first flow path of the heat exchanger and an inlet side through which the fuel gas is introduced to the anode side of each power generation cell, from a direction that intersects the stacking direction.

In this configuration, a flow path that is configured to cover an outside of the fuel cell stack with the bowl-shaped member is used as the second flow path of fuel gas. Thus, there is an advantage that an internal structure of the fuel cell stack can be simplified.

In the present invention described above, an electrolyte layer (a solid electrolyte layer, for example) has ionic conductivity in which a portion of one of fuel gas introduced to the anode and oxidant gas introduced to the cathode during operation of a battery can be moved as an ion. This ion includes, for example, an oxygen ion and a hydrogen ion, etc. In addition, the anode is brought into contact with fuel gas as a reducing agent, and serves as a negative electrode in the cell. The cathode is brought into contact with oxidant gas as an oxidizing agent, and serves as a positive electrode in the cell.

Then, when power generation is performed using the fuel cell, fuel gas is introduced to the anode side, and oxidant gas is introduced to the cathode side.

Fuel gas includes hydrogen, hydrocarbon that is a reducing agent, mixed gas of hydrogen and hydrocarbon, and fuel gas produced by passing these gases through water at a predetermined temperature and humidified, fuel gas produced by mixing inert gas to these gases, and so on. There is no particular limitation to hydrocarbon. For example, hydrocarbon includes natural gas, naphtha, coal gasification gas, and so on. Hydrogen is preferable as the fuel gas. These fuel gases may be used alone, or may be used in combination of two or more. Also, these fuel gases may contain inert gas such as nitrogen and argon in an amount of 50 vol % or less.

Oxidant gas includes a gas mixture of oxygen and other gases and so on. In addition, inert gas such as nitrogen and argon in an amount of 80 vol % or less may be contained in the gas mixture. Among these oxidant gases, air (containing nitrogen in an amount of about 80 vol %) is preferable because air is safe and inexpensive.

BRIEF DESCRIPTION OF THE DRAWINGS

FIG. 4 is a perspective view showing a disassembled state of the fuel cell and so on.

FIG. 14A is a plan view illustrating a front surface (top surface) of a member for air in Embodiment 7, FIG. 14B is a plan view showing a back surface (under surface) of the member for air, FIG. 14C is a plan view illustrating a front surface (top surface) of a member for fuel gas, and FIG. 14D is a plan view showing a back surface (under surface) of the member for fuel gas.

FIG. 19A is a plan view illustrating a front surface (top surface) of a member for air in Embodiment 8, FIG. 19B is a plan view showing a back surface (under surface) of the member for air, FIG. 19C is a plan view illustrating a front surface (top surface) of a member for fuel gas, and FIG. 19D is a plan view showing a back surface (under surface) of the member for fuel gas.

FIG. 24A is an explanatory diagram showing a configuration of a gas flow path using an insertion hole in Embodiment 12, and FIG. 24B is an explanatory diagram illustrating a modification of the configuration of the gas flow path using the insertion hole.

Figure 1:
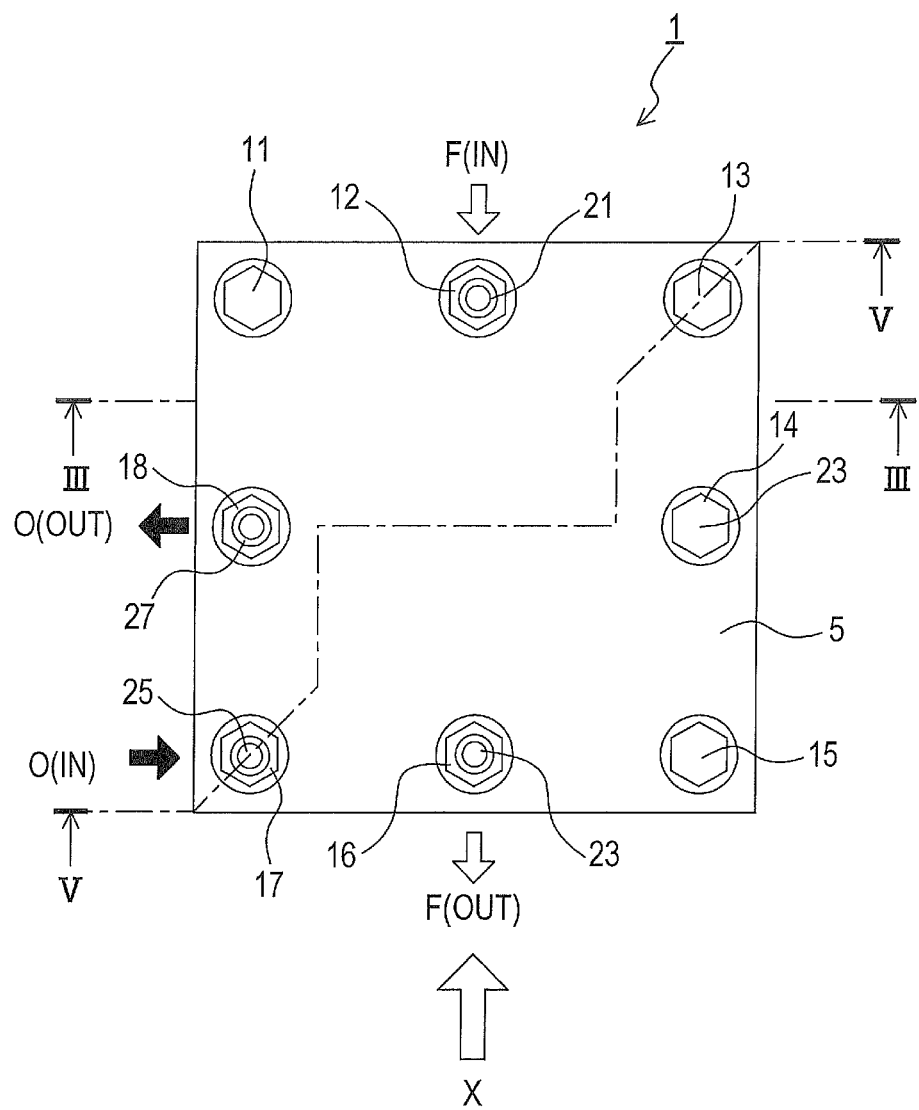
FIG. 1 is a plan view of a solid oxide fuel cell according to Embodiment 1.

EXPLANATION OF REFERENCE NUMERALS 1, 121, 151, 181, 211, 261, 321, 351 . . . fuel cell (solid oxide fuel cell)
3, 123, 153, 183, 213, 273, 333, 441 . . . power generation cell
5, 125, 155, 185, 215, 291, 401, 421, 422, 445, 471 . . . fuel cell stack
7, 127, 129, 157, 187, 217, 243, 263, 323, 353, 407, 413, 443, 489 . . . heat exchanger
33 . . . anode
35 . . . solid oxide body (solid electrolyte)
37 . . . cathode
39 . . . air flow path
43 . . . inter-connector
45, 51 . . . gas seal
47 . . . separator
49 . . . anode frame
53 . . . anode side collector
55 . . . cathode side collector
61, 62, 63, 64, 65, 66, 67, 68, 131, 133, 159, 161, 247, 249, 251, 281, 282, 283, 284, 285, 286, 287, 288, 341, 342, 343, 344, 345, 346, 347, 348, 371, 372, 373, 374, 375, 376, 377, 378, 447, 473 . . . insertion hole
114, 138, 140, 174, 204, 234 . . . first flow path
197, 227 . . . cover member
205, 235 . . . communication space

MODE FOR CARRYING OUT THE INVENTION

Hereinafter, a solid oxide fuel cell as a fuel cell to which the present invention is applied will be described by way of example.

Embodiment 1 a) First, a schematic structure of a fuel cell according to the present embodiment will be described.

Figure 2:
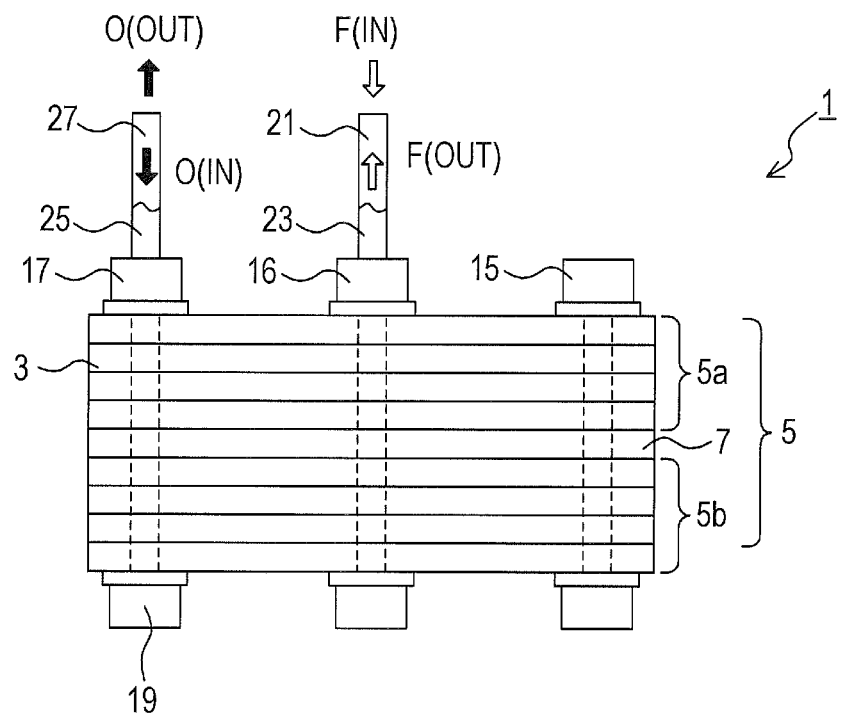
FIG. 2 is a schematic diagram of a side view of the solid oxide fuel cell of Embodiment 1, as seen from an X direction in FIG. 1.

As shown in FIGS. 1 and 2, a solid oxide fuel cell 1 (hereinafter, merely referred to as fuel cell) of the present embodiment is a device that generates power in receipt of fuel gas (hydrogen, for example) and oxidant gas (air, for example). In the drawings, oxidant gas is indicated by "O", and fuel gas is indicated by "F". Also, "IN" indicates that the gas is introduced, and "OUT" indicates that the gas is discharged (the same shall apply hereinafter).

The fuel cell 1 includes a fuel cell stack 5, a plurality of bolts 11 to 18, and nuts 19 (called collectively). The fuel cell stack 5 includes a plurality of (eight, for example) plate-shaped fuel battery cells 3 (hereinafter, referred to as power generation cells), each of which is a power generation unit, and which are stacked in a stacking direction (vertical direction in FIG. 2). The bolts 11 to 18 penetrate the fuel cell stack 5 in the stacking direction. The nuts 19 are screwed into both ends of the bolts 11 to 18.

As will be described below, the fuel cell stack 5 is formed by inserting a planar heat exchanger 7 between a top fuel cell stack 5a and a bottom fuel cell stack 5b (see FIG. 2).

Further, among the bolts 11 to 18, the second bolt 12 includes a fuel gas inlet pipe 21 that supplies fuel gas to the fuel cell stack 5, the sixth bolt 16 includes a fuel gas outlet pipe 23 that discharges fuel gas after power generation from the fuel cell stack 5, the seventh bolt 17 includes an air inlet pipe 25 that supplies air to the fuel cell stack 5, and the eighth bolt 18 includes an air outlet pipe 27 that discharges air after power generation from the fuel cell stack 5.

The first bolt 11, the fourth bolt 14, and the fifth bolt 15 among the bolts 11 to 18 are used only for securing the fuel cell stack 5.

On the other hand, the other bolts 12, 13, 16, 17 and 18 are used to secure the fuel cell stack 5, and are arranged along a flow path for circulation of gas. That is, as will be described later in detail (see FIG. 4), a third insertion hole 63, a seventh insertion hole 67, and an eighth insertion hole 68 through which the third bolt 13, the seventh bolt 17 and the eighth bolt 18 are respectively inserted are used as air flow paths, and a second insertion hole 62 and a sixth insertion hole 66 through which the second bolt 12 and the sixth bolt 16 are respectively inserted are used as fuel gas flow paths.

It should be noted that reference numbers (11 to 18, 61 to 68, etc.) of the first to eighth bolts and insertion holes are assigned in a clockwise manner, when the fuel cell stack 5 is viewed from its top surface side (see FIG. 1) (the same shall apply hereinafter).

Hereinafter, a configuration of each component will be described.

Figure 3:
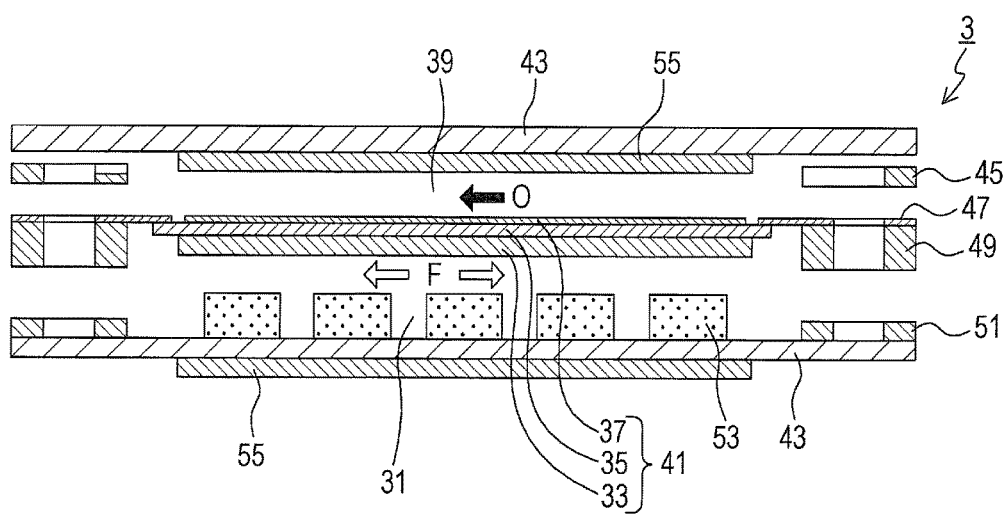
FIG. 3 is an explanatory diagram illustrating a disassembled state of the fuel cell, taken along a line III-III of FIG. 1.

As shown disassembled in FIG. 3, the power generation cell 3 is a plate-like power generation cell of a so-called anode supported film type. A plate-like anode (anode) 33 is arranged on a fuel gas flow path 31 side of the power generation cell 3. On a surface of the anode 33 at an upper side in FIG. 3, a thin-film solid electrolyte body (solid oxide body) 35 (which is an electrolyte layer) is formed. On a surface of the solid oxide body 35 at an air flow path 39 side, a thin-film cathode (cathode) 37 is formed. The anode 33, the solid oxide body 35, and the cathode 37, are collectively referred to as a cell body 41.

Further, the power generation cell 3 includes, between a pair of upper and lower inter-connectors 43 and 43, a plate-shaped gas seal portion 45 on the cathode 37 side, a separator 47 joined to a top surface of an outer edge of the cell body 41 to cause interruption between the air flow path 39 and the fuel gas flow path 31, an anode frame 49 disposed on the fuel gas flow path 31 side, and a plate-shaped gas seal portion 51 on the anode 33 (disposed outside of the anode frame 49 (lower section of FIG. 3)) side. The power generation cell 3 is integrally formed by stacking the above components.

In addition, inside the power generation cell 3, an anode side current collector 53 is disposed between the anode 33 and the inter-connector 43 at a lower side of FIG. 3. On a surface of one (lower section of FIG. 3) of the inter-connectors 43, a cathode side current collector 55 is integrally formed.

It should be noted that the fuel cell stack 5 is formed by electrically connecting a plurality of power generation cells 3 in series. In addition, in the air flow path 39 in the power generation cell 3, air is supplied in a horizontal direction of FIG. 3. In the fuel gas flow path 31, fuel gas is supplied in a direction perpendicular to the drawing sheet of FIG. 3.

Here, as the solid oxide body 35, materials such as YSZ, ScSZ, SDC, GDC, perovskite-based oxide, and so on can be used. Further, as the anode 33, Ni and a cermet of Ni and ceramic can be used. As the cathode 37, perovskite-based oxide, a variety of noble metal and a cermet of noble metal and ceramic can be used.

The materials used are not limited to those indicated above. Other materials may be appropriately used, in addition to those described above.

b) In the following, each member constituting the power generation cell 3 will be described in more detail, based on FIG. 4.

Figure 4:
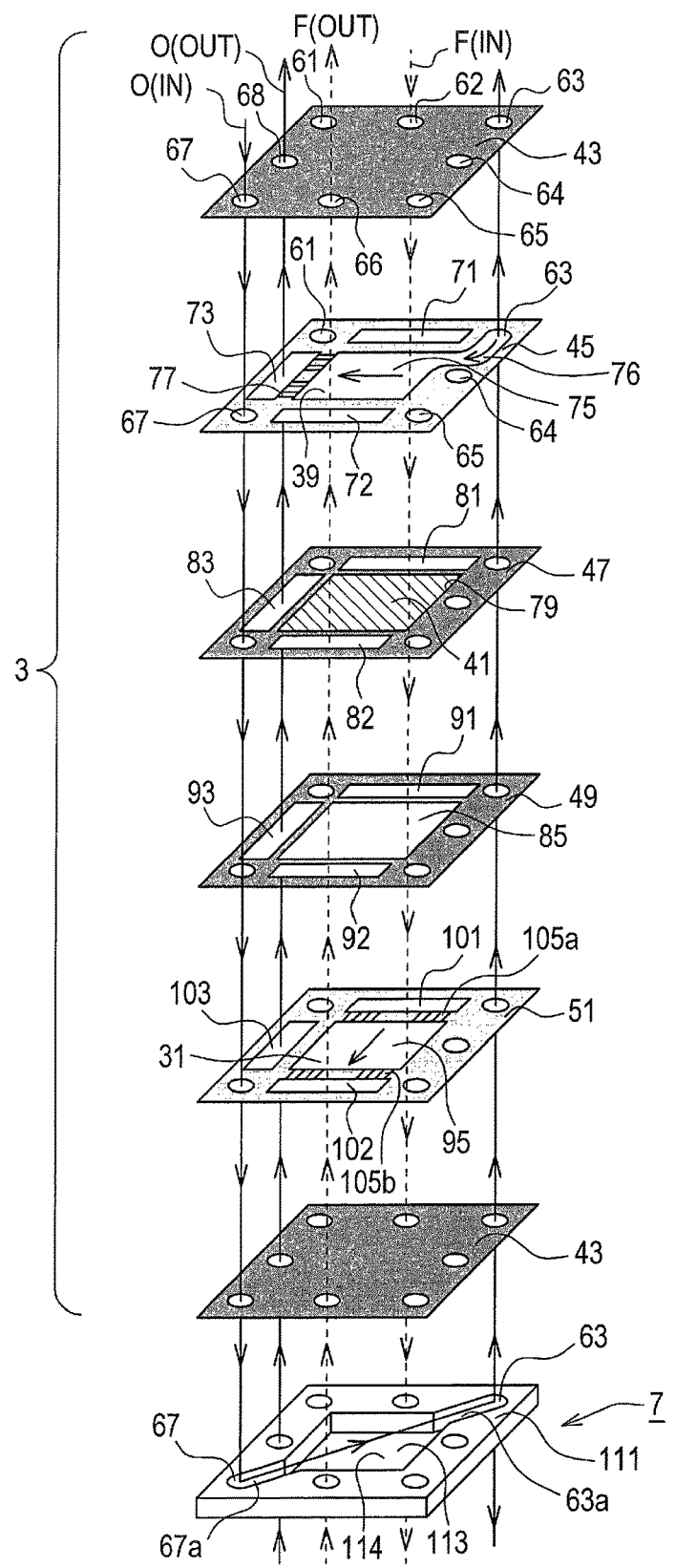

It should be noted that, although FIG. 4 shows only a single power generation cell 3 at one side of the heat exchanger 7, a plurality of power generation cells 3 are practically stacked on both sides (vertical direction in FIG. 4) of the heat exchanger 7.

As shown disassembled in FIG. 4, the inter-connector 43 is a plate, for example, made of ferritic stainless. In an outer edge portion of the inter-connector 43, round insertion holes (first to eighth insertion holes) 61 to 68 through which the bolts 11 to 18 penetrate are formed at equal intervals. In other words, the insertion holes 61 to 68 (the same reference numbers are assigned to insertion holes in each member: the same shall apply hereinafter) are formed at eight positions corresponding to four corners and midpoints of four sides of the inter-connector 43.

The gas seal portion 45 on the cathode 37 side is made, for example, from mica or vermiculite, and is a frame-shaped plate having a square opening 75 in its center. In its four corners and right side edge, the insertion holes 61, 63, 64, 65 and 67 through which the bolts 11, 13, 14, 15 and 17 respectively penetrate are formed.

In edge portions of three sides of the gas seal portion 45, substantially rectangular-shaped elongated through holes (first to third elongated through holes) 71 to 73 serving as gas flow paths are formed along the sides so as to communicate with the insertion holes 62, 66 and 68, respectively. In other words, the elongated through holes 71 to 73 are formed to respectively include the insertion holes 62, 66 and 68, when viewed from the stacking direction.

Here, the first elongated through hole 71 is a flow path used for introducing fuel gas into the fuel cell stack 5 from outside. The second elongated through hole 72 is a flow path used for discharging fuel gas after power generation outside the fuel cell stack 5. The third elongated through hole 73 is a flow path used to discharge air after power generation outside the fuel cell stack 5.

Particularly, in the present embodiment, the third insertion hole 63 communicates with the opening 75 through a communication hole 76, in the gas seal portion 45 on the cathode 37 side. As described later, air introduced from the third insertion hole 63 is introduced into the opening 75 through the communication hole 76.

In addition, the gas seal portion 45 is provided with a plurality of rectangular notches 77 serving as narrow gas flow paths formed at a frame portion of the gas seal portion 45 so that the opening 75 communicates with the third elongated through hole 73

The notches 77 are not through holes but are grooves created by digging one surface (upper section of FIG. 4) of the gas seal portion 45, and can be formed by laser or stamping.

Further, the separator 47 is a frame-shaped plate, for example, made of ferritic stainless. To a square opening 79 in its center, the cell body 41 is bonded so as to close the opening 79.

The separator 47 as well, similar to the gas seal portion 45, has the insertion holes 61, 63, 64, 65 and 67, and elongated through holes 81 to 83 formed along three sides.

Furthermore, the anode frame 49 is a frame-shaped plate, for example, made of ferritic stainless steel having a center opening 85. Similar to the separator 47, the anode frame 49 has the insertion holes 61, 63, 64, 65 and 67, and elongated through holes 91 to 93 formed along three sides.

The gas seal portion 51 on the anode 33 side, similar to the gas seal portion 45 on the cathode 37 side, is a frame-shaped plate, for example, made of mica or vermiculite, provided with an opening 95 in its center. The gas seal portion 51 has the insertion holes 61, 63, 64, 65 and 67, and elongated through holes 101 to 103 formed along three sides.

The gas seal portion 51 is also provided with a plurality of notches 105a and 105b serving as narrow gas flow paths at opposing frame portions, so that the opening 95 communicates with the first and second elongated through holes 101 and 102.

c) Next, an internal configuration of the fuel cell stack 5 that is a main part of the present embodiment will be described with reference to FIGS. 5 and 6A to 6B.

Figure 5:
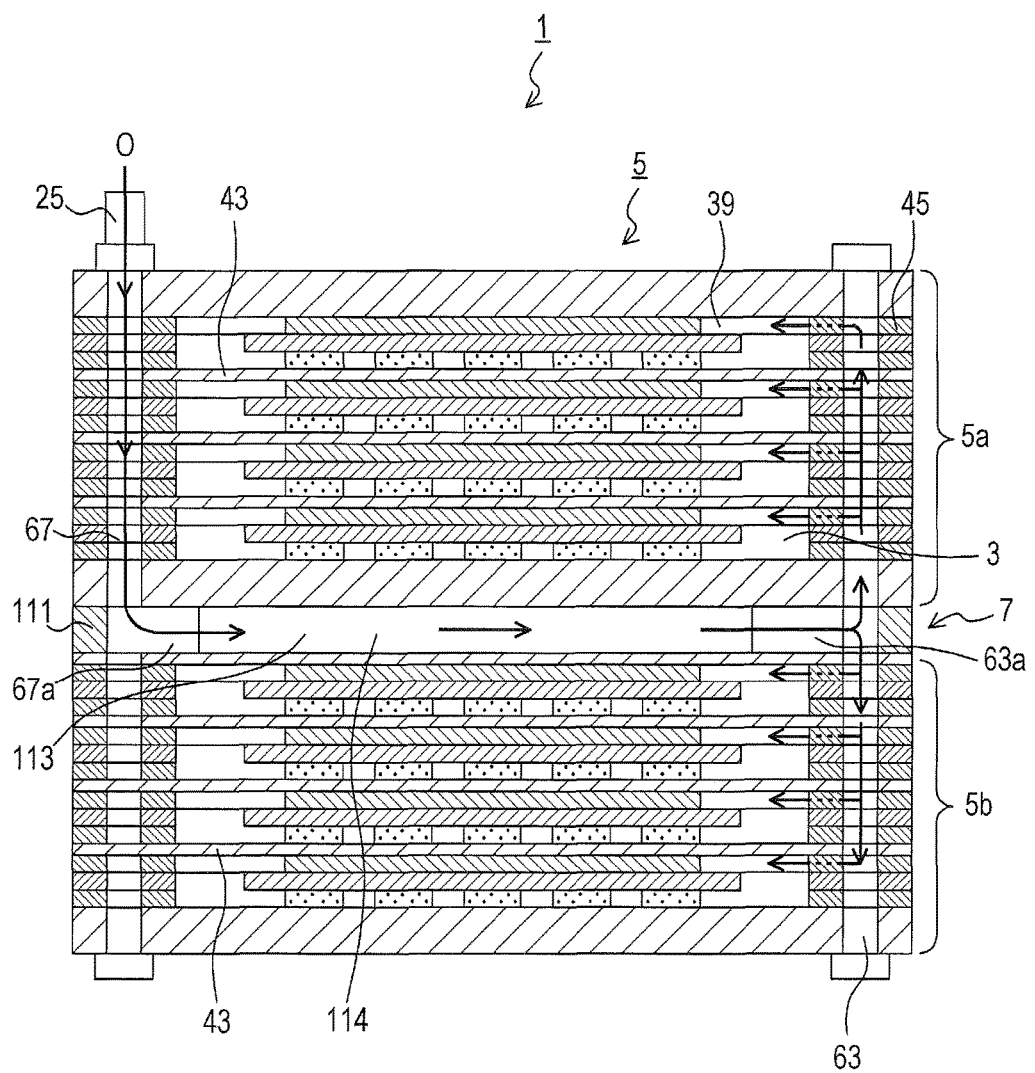
FIG. 5 is a cross-sectional view schematically showing a state of the solid oxide fuel cell of Embodiment 1, taken along a line V-V of FIG. 1.

As shown in FIG. 5, in the fuel cell 1 of the present embodiment, the fuel cell stack 5 includes the top fuel cell stack 5a, the bottom fuel cell stack 5b, and the plate-shaped heat exchanger 7. The top fuel cell stack 5a includes a plurality of (four, for example) planar power generation cells 3 that are stacked one another. The bottom fuel cell stack 5b includes a plurality of (four, for example) planar power generation cells 3 that are stacked one another. The heat exchanger 7 is provided between the top fuel cell stack 5a and the bottom fuel cell stack 5b. That is, in the fuel cell 1, the heat exchanger 7 is arranged in a middle section (center part) of the fuel cell stack in the stacking direction of the fuel cell stack 5.

Further, the power generation cells 3 in the top fuel cell stack 5a are electrically connected to each other by the inter-connectors 43 (in a vertical direction in FIG. 5). Similarly, the power generation cells 3 in the bottom fuel cell stack 5b are electrically connected to each other by the inter-connectors 43. The top fuel cell stack 5a and the bottom fuel cell stack 5b are electrically connected to each other by a heat exchanger frame body 111 that constitutes the heat exchanger 7.

A configuration as follows can be employed as a configuration of electrical connection by the heat exchanger frame body 111. That is, the heat exchanger frame body 111 itself is a conductor, or the heat exchanger frame body 111 includes an insulator such as, for example, ceramic wherein a via conductor or the like is arranged to penetrate the insulator in its thickness direction.

Figure 6A:
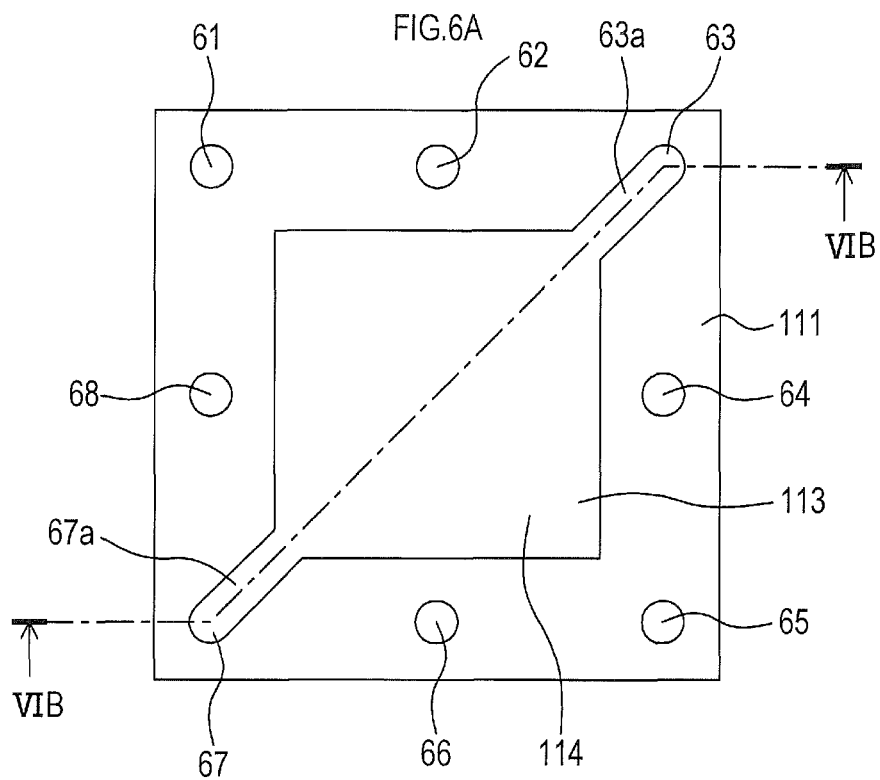
FIG. 6A is a plan view showing a heat exchanger frame.

As shown in FIG. 6A, the heat exchanger frame body 111 is a member, for example, made of ferritic stainless, having a square planar shape. As shown in FIG. 6B, the heat exchanger 7 is constituted by covering the heat exchanger frame body 111 from both sides (vertical direction in FIG. 6B) in its thickness direction with an inter-connector 43a at a lower end of the top fuel cell stack 5a and an inter-connector 43b at an upper end of the bottom fuel cell stack 5b.

Figure 6B:
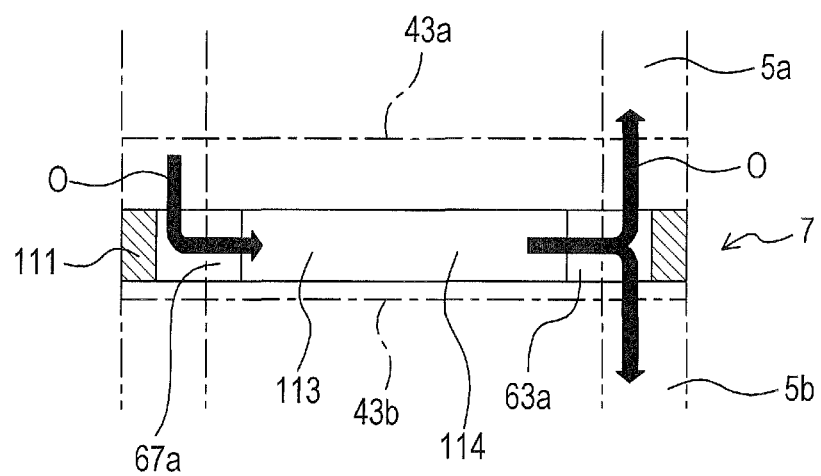
FIG. 6B is a cross-sectional view showing a cross-section taken along a line VIB-VIB of FIG. 6A.

Here, in FIGS. 5 and 6B, the inter-connectors 43, 43a and 43b are different in thickness in the drawings. However, the inter-connectors are not limited to those described in FIGS. 5 and 6B. For example, instead of using inter-connectors having different thickness, inter-connectors having the same thickness may be used.

Further, as shown in FIG. 6A, the heat exchanger frame body 111 has a square opening 113 in its center. In a periphery of the opening 113, the insertion holes 61 to 68 to which the bolt 11 to 18 are inserted are formed.

In particular, in the present embodiment, communication holes 63a and 67a are formed respectively in the third insertion hole 63 and the seventh insertion hole 67 (located at a farthest distance in a diagonal direction) so as to be in communication with the opening 113 and extend in the diagonal direction.

Therefore, as described below, air supplied from the seventh insertion hole 67 and introduced into the opening 113 from the communication hole 67a is guided to the third insertion hole 63 from the communication hole 63a.

Here, an air flow path in the opening 113 of the heat exchanger 7 is formed so as to extend in a surface direction of the power generation cell 3.

Further, with respect to a size (cross-sectional area perpendicular to a flow direction) of a flow path leading to the communication hole 63a from the opening 113 of the heat exchanger 7, a so-called pressure loss structure is formed in which the communication hole 63a is sufficiently smaller than the opening 113, and the flow path is reduced toward the communication hole 63a.

A width (size from an outer periphery to the opening 113) of a frame in the heat exchanger frame body 111 is set to be larger than a width of the gas seal portion 45, etc. that constitute the frame portion of the power generation cell 3.

d) Next, gas flow paths in the present embodiment will be described with reference to FIGS. 4 and 5.

<Air Flow Path>

As shown in FIGS. 4 and 5, air introduced into the fuel cell stack 5a in the stacking direction (vertical direction in both figures) of the fuel cell stack 5 from the air inlet pipe 25 reaches the heat exchanger 7 through the seventh insertion hole 67. To the seventh insertion hole 67, the seventh bolt 17 is inserted. Air is then introduced to an interior (opening 113) of the heat exchanger 7 through the communication hole 67a.

Although the bottom fuel cell stack 5b also has the seventh insertion hole 67, flow of air is little because there is no air outlet hole in the portion.

In this heat exchanger 7, heat exchange is performed between air in the opening 113 of the heat exchanger 7, and the top fuel cell stack 5a (in particular, the power generation cell 3 at a lower end) and the bottom fuel cell stack 5b (in particular, the power generation cell 3 at an upper end) at both sides in the stacking direction.

In other words, air in the opening 113 of the heat exchanger 7 is heated by the power generation cells 3 on both sides of the heat exchanger 7 and raises its temperature. On the contrary, the power generation cells 3 at both sides of the heat exchanger 7 are cooled by air inside the opening 113 of the exchanger 7 and lower their temperature.

Air having an increased temperature by heat exchange is introduced to the insertion hole 63 to which the third bolt 13 is inserted, through the communication hole 63a (located on a diagonal line of the seventh insertion hole 67).

Air introduced to the third insertion hole 63 branches and is guided to both sides of the stacking direction (vertical direction in both figures) along the third insertion hole 63, and is respectively introduced to the air flow path 39 of each of the power generation cells 3 of the top fuel cell stack 5a and bottom fuel cell stack 5b.

As shown in FIG. 4, air that has reached the third insertion hole 63 of the gas seal portion 45 on the cathode 37 side is guided by the communication hole 76 and introduced into the opening 75 (i.e., air flow path 39) to be used for power generation in the cathode 37.

Air after power generation is then introduced to the third elongated through hole 73 from the opening 75 through the notches 77.

Thereafter, air guided to the third elongated through hole 73 is guided to the upper section of FIG. 4 through the eighth insertion hole 68, and is discharged outside from the air outlet pipe 27 (see FIG. 1).

It should be noted that the air flow path in a plane direction inside the heat exchanger 7 (flow path having the opening 113 and the communication holes 63a and 67a) is a first flow path of the present invention, and the third insertion hole 63 that supplies air in the stacking direction of the fuel cell stack 5 is a second flow path of the present invention.

<Fuel Gas Flow Path>

Fuel gas introduced into the fuel cell stack 5 from the fuel gas inlet pipe 21 (see FIG. 1) is introduced to a space formed by the first elongated through holes 71, 81, 91 and 101 of each member, through the second insertion hole 62, as shown in FIG. 4.

Fuel gas is then introduced into the opening 95 (i.e., fuel gas flow path 31) from the space having the first elongated through holes 71, 81, 91 and 101 through the notches 105*a*.

Residual fuel gas that has contributed to power generation in the power generation cells 3 is then discharged into a space formed by the second elongated through holes 72, 82, 92 and 102 of each member through the notches 105*b*.

The residual fuel gas is then discharged outside the fuel cell stack 5 from the space having the second elongated through holes 72, 82, 92 and 102, via the sixth insertion hole 66, etc., through the fuel gas outlet pipe 23 (see FIG. 1).

e) Here, a brief description will be given on a manufacturing method of the fuel cell 1 of the present embodiment.

As shown in FIG. 2, upon manufacturing the fuel cell 1 of the present embodiment, a plurality of power generation cells 3 are stacked so as to constitute the top fuel cell stack 5*a* and the bottom fuel cell stack 5*b*, and the heat exchanger 7 is disposed between the top fuel cell stack 5*a* and the bottom fuel cell stack 5*b*. Then, the top fuel cell stack 5*a*, the heat exchanger 7 and the bottom fuel cell stack 5*b* are stacked (in a manner that the first to eighth through holes 61 to 68 coincide). Then, the bolts 11 to 18 are inserted to the insertion holes 61 to 68 and secured with the nuts 19 for integration.

Each of the power generation cells 3 can be configured by stacking the inter-connector 43, the gas seal portion 45, separator 47, anode frame 49, and gas seal portion 51, as shown in FIG. 4, and integrating the foregoing members upon fixing by the bolts 11 to 18 and nuts 19. In addition, the heat exchanger 7 can be produced, for example, by cutting or punching, etc. of a sheet material.

f) Effect of the present embodiment will be described.

In the present embodiment, the heat exchanger 7 is provided between the power generation cells 3 that make up the fuel cell stack 5. The heat exchanger 7 has the first flow path 114 that passes air supplied from outside. Further, the outlet side of the first flow path 114 is connected to the flow path (second flow path) having the third insertion hole 63 that supplies air discharged from the first flow path 114 to the power generation cells 3 disposed in the stacking direction.

Thus, when air having a temperature lower than a temperature of the center portion of the fuel cell stack 5 is supplied to the first flow path 114 of the heat exchanger 7 from outside, the air temperature is raised by heat exchange with the adjacent power generation cells 3 and the temperature of the adjacent power generation cells 3 is lowered. Since air having the increased temperature by heat exchange is supplied to the power generation cells 3 on the end sides in the stacking direction, the temperature of the power generation cells 3 is raised by air. As a result, the temperature in the center is lowered and the temperature on the end sides is raised in the stacking direction of the fuel cell stack 5. Thereby, the temperature in the stacking direction is equalized.

That is, in the present embodiment, since the heat exchange is performed with cool air from outside by the heat exchanger 7 arranged in the center having the high temperature, it is possible to efficiently decrease the temperature in the center, and increase the temperature of the end sides having low temperature by supplying air having the increased temperature by heat exchange to the end sides. Thereby, remarkable effect is exhibited in which the temperature in the stacking direction of the fuel cell stack 5 is equalized and thus power generation efficiency is improved.

In the present embodiment, since more oxidant gas is supplied than fuel gas, the above mentioned effect of equalization in temperature and improvement in power generation efficiency is more pronounced by using the heat exchanger 7 provided with the first flow path 114 that is an air flow path, as in the present embodiment.

In the present embodiment, air supplied from outside is heated by the heat exchanger 7. Thus, there is an advantage that a device or the like that heats air in advance (preheats) is not required.

In the present embodiment, the first flow path 114 in the heat exchanger 7 is formed so as to extend in the surface direction of the power generation cell 3. Thus, there is an advantage of good heat exchange efficiency.

In the present embodiment, the heat exchanger 7 is disposed in the center of the fuel cell stack 5 in the stacking direction. Thus, the center having the high temperature can be efficiently cooled.

In the present embodiment, the first flow path 114 is configured to have a pressure loss structure. Thus, as compared with the pressure of the gas in the power generation cell 3, the pressure inside the first flow path 114 can be increased. Since the fuel cell stack 5 can be depressed in the stacking direction, the power generation cells 3 can strongly adhere to each other. Accordingly, it is possible to improve the thermal conductivity and electrical connection between the power generation cells 3.

In the present embodiment, the second flow path (third insertion hole 63) is formed so as to extend in the stacking direction inside the fuel cell stack 5. Thus, the fuel cell stack 5 can be compact (space saving).

In the present embodiment, because the inlet side and the outlet side of air in the first flow path 114 are formed in farthest positions in the diagonal direction, the flow path where heat exchange of air is performed is long. There is an advantage that heat exchange can be efficiently performed.

In the present embodiment, the heat exchanger 7 that performs heat exchange of air is arranged in the center of the fuel cell stack 5. In addition to the heat exchanger 7 (or in place of the heat exchanger 7), another heat exchanger (that performs heat exchange of fuel gas) may be provided at a similar position (the center of the fuel cell stack 5) in order to perform heat exchange of fuel gas. In this case, fuel gas that is heat exchanged in the heat exchanger is supplied to the fuel gas flow path of the power generation cells on the end sides through the second flow path. It should be noted that the air flow path is provided separately.

Embodiment 2

Next, Embodiment 2 will be described, but description of contents similar to the contents in Embodiment 1 will be omitted.

In a fuel cell of the present embodiment, a heat exchanger is arranged at each of two locations in a stacking direction of a fuel cell stack.

a) First, a structure of the fuel cell according to the present embodiment will be described.

Figure 7:
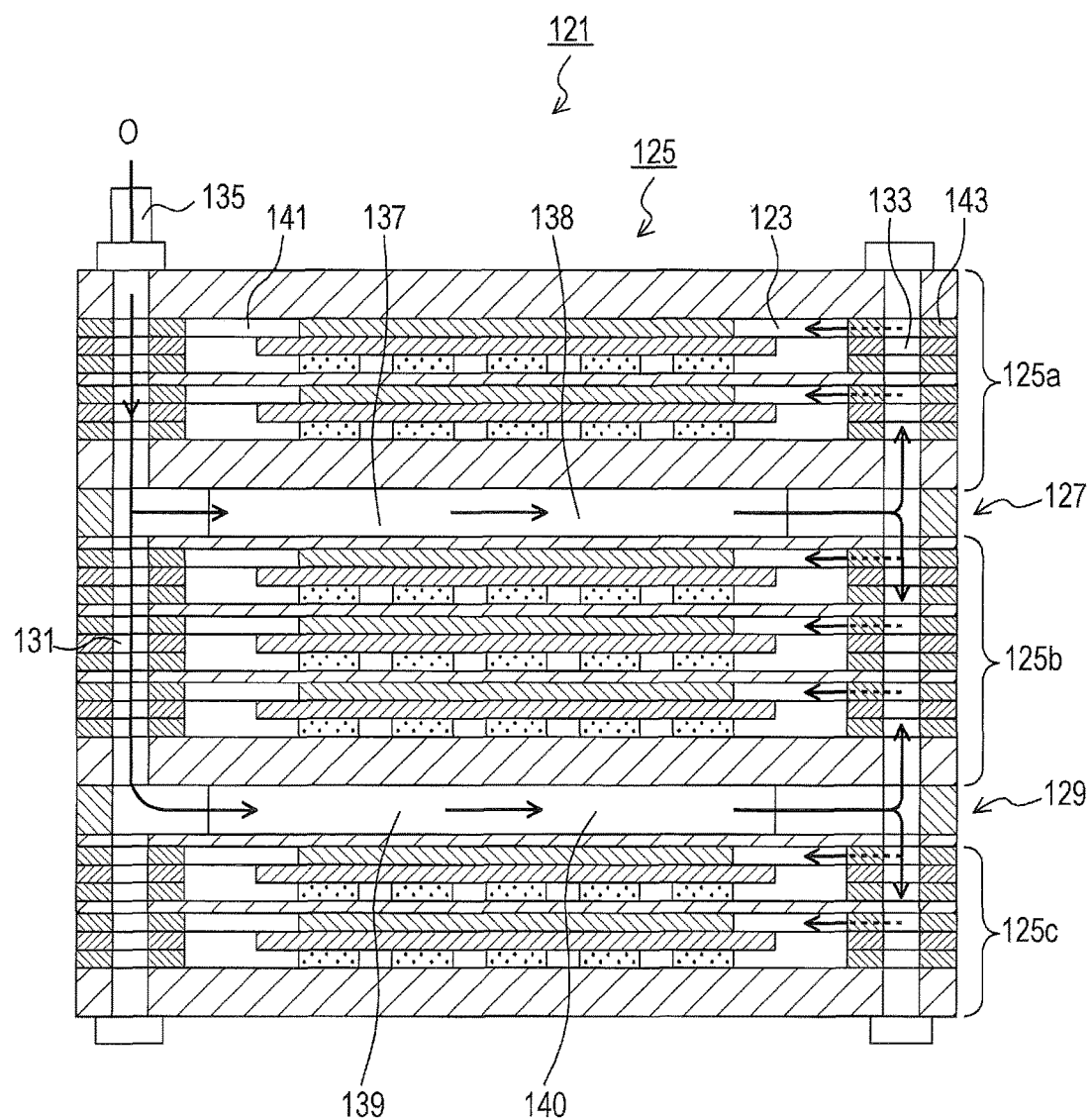
FIG. 7 is a cross-sectional view schematically showing a state of the solid oxide fuel cell of Embodiment 2, taken along the same line as the line V-V of FIG. 1.

As shown in FIG. 7, the fuel cell 121 of the present embodiment is provided with a fuel cell stack 125 including seven power generation cells 123 (similar to the power generation cells in Embodiment 1) that are stacked one another. Further, heat exchangers 127 and 129 similar to the heat exchanger in Embodiment 1 are arranged at two locations in a stacking direction of a fuel cell stack 125.

In detail, the first heat exchanger 127 is disposed between a top fuel cell stack 125*a* including two stacked power generation cells 123 and an intermediate fuel cell stack 125*b* including three stacked power generation cells 123. The second heat exchanger 129 is disposed between the intermediate fuel cell stack 125*b* and a bottom fuel cell stack 125*c* including two stacked power generation cells 123.

A seventh insertion hole 131 that introduces air into the fuel cell stack 125 is formed, in the same manner as in Embodiment 1 (at a similar position), so as to penetrate the fuel cell stack 125 in the stacking direction. Further, in order to guide the heat exchanged air to the stacking direction, a third insertion hole 133 is formed in the same manner as in Embodiment 1 (at a similar position).

It should be noted that other configurations, such as, for example, other insertion holes and fuel gas flow paths, are basically the same as those in Embodiment 1. Thus, description thereof is omitted.

b) Next, air flow paths in the present embodiment will be described.

As shown in FIG. 7, air is introduced into the fuel cell stack 125, i.e., into the seventh insertion hole 131, in the stacking direction (vertical direction in FIG. 7) of the fuel cell stack 125 from an air inlet pipe 135.

Then, air is introduced both to an interior (first flow path 138 including an opening 137) of the first heat exchanger 127 and to an interior (first flow path 140 including an opening 139) of the second heat exchanger 129 from the seventh insertion hole 131.

In the same manner as in Embodiment 1, heat exchange is performed between air and the upper and lower power generation cells 123, and air is heated in the two heat exchangers 127 and 129.

Then, air having the increased temperature by heat exchange is introduced to the third insertion hole 133 (that is a second flow path located in a diagonal direction in a plane of the seventh insertion hole 131).

Then, air introduced to the third insertion hole 133 branches and is guided to both sides (vertical direction in FIG. 7) of the stacking direction along the third insertion hole 133, and is introduced to an air flow path 141 of each of the power generation cells 123 of the top fuel cell stack 125*a*, intermediate fuel cell stack 125*b* and bottom fuel cell stack 125*c*.

Introduction of air to the air flow path 141 of each of the power generation cells 123 from the third insertion hole 133 is performed via a communication hole (not shown) similar to the communication hole in Embodiment 1 provided in a gas seal portion 143 on a cathode side.

Air used for power generation in the cathode of each of the power generation cells 123 is guided to an upper section of FIG. 7 through an eighth insertion hole (not shown), and is discharged outside from an air outlet pipe (not shown), in the same manner as in Embodiment 1.

A fuel gas flow path is similar to the fuel gas flow path of Embodiment 1, and thus description thereof is omitted.

c) In the present embodiment, the same effect as in Embodiment 1 is produced. Also, because the heat exchangers 127 and 129 are provided at different two locations in the stacking direction of the fuel cell stack 125, heat exchange can be performed between air and the power generation cells 123 in each of the heat exchangers 127 and 129. Accordingly, remarkable effect is achieved in which temperature distribution in the stacking direction is all the more equalized.

Embodiment 3

Next, Embodiment 3 will be described. However, description of contents similar to the contents in Embodiment 1 will be omitted.

A fuel cell of the present embodiment supplies air heated by heat exchange to inner power generation cells from outer power generation cells in the stacking direction of the fuel cell stack in turn.

In the present embodiment, the eighth insertion hole through which the eighth bolt is inserted is not used as a flow path for discharging air, and the fifth insertion hole through which the fifth bolt is inserted is used as a flow path for discharging air.

a) First, a structure of the fuel cell according to the present embodiment will be described.

Figure 8:
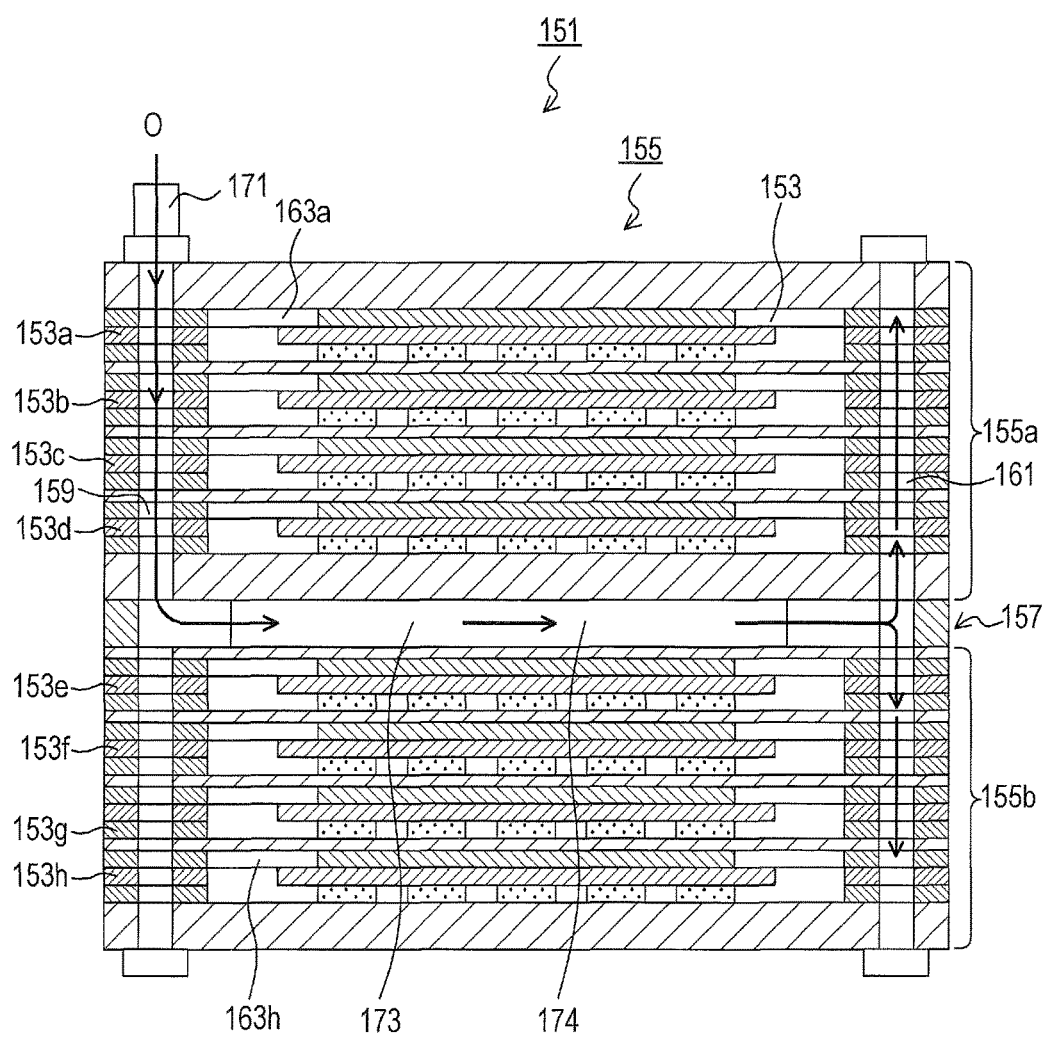
FIG. 8 is a cross-sectional view schematically showing a state of the solid oxide fuel cell of Embodiment 3, taken along the same line as the line V-V of FIG. 1.

As shown in FIG. 8, the fuel cell 151 of the present embodiment is provided with a fuel cell stack 155 including eight power generation cells 153 (similar to the power generation cells in Embodiment 1) that are stacked one another, and a heat exchanger 157 similar to the heat exchanger in Embodiment 1 is disposed at a center in a stacking direction of the fuel cell stack 155.

In detail, the heat exchanger 157 is arranged between a top fuel cell stack 155*a* including first to fourth stacked power generation cells 153*a* to 153*d* and a bottom fuel cell stack 155*b* including fifth to eighth stacked power generation cells 153*e* to 153*h*.

Then, a seventh insertion hole 159 that introduces air into the fuel cell stack 155 in the same manner as in Embodiment 1 (to a similar position) is formed to penetrate the stacking direction of the fuel cell stack 155. Further, a third insertion hole 161 that is a second flow path is formed in the same manner as in Embodiment 1 (at a similar position) in order to guide heat exchanged air towards ends of the stacking direction.

Figure 9:
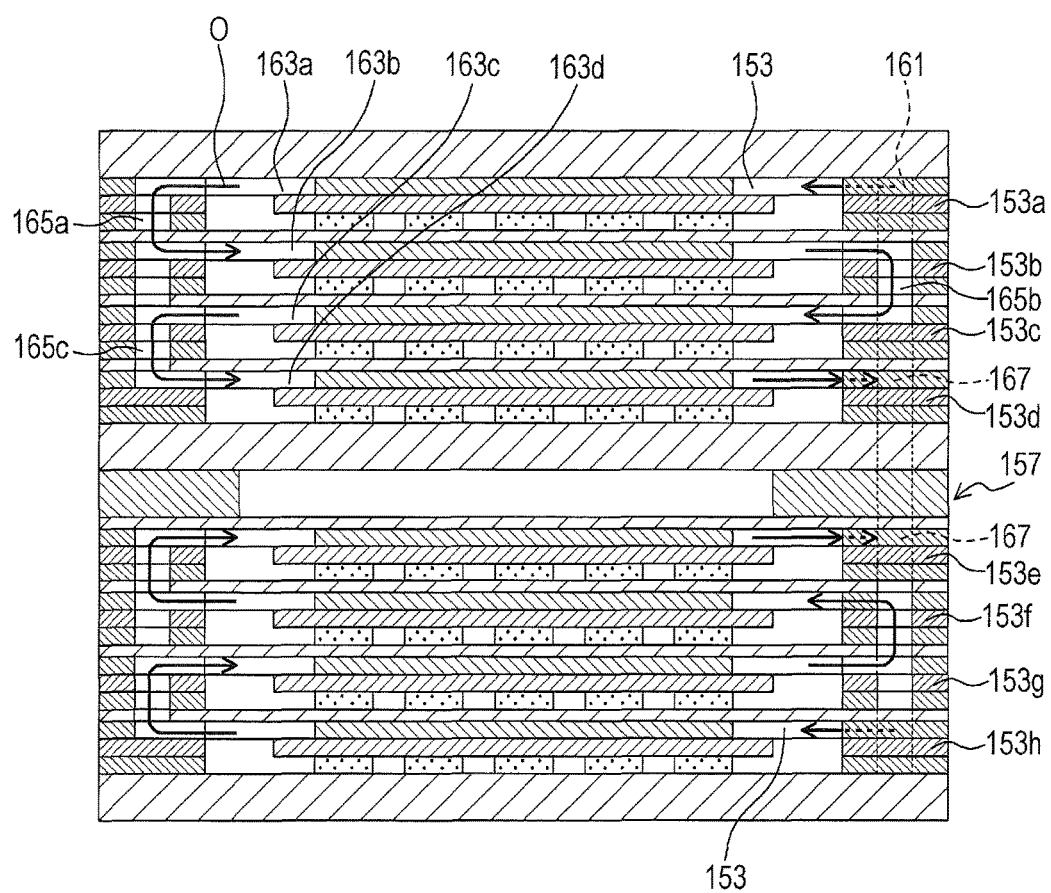
FIG. 9 is a cross-sectional view schematically showing a state of the solid oxide fuel cell of Embodiment 3, taken along the same line as the line III-III of FIG. 1.

In particular, in the present embodiment, as shown in FIG. 9, air flow paths are formed such that air heated by heat exchange is supplied sequentially from the first power generation cell 153*a* at one end (upper end in the figure) in the stacking direction to the fourth power generation cell 153*d* to a center through the second and third power generation cells 153*b* and 153*c*, and is also supplied sequentially from the eighth power generation cell 153*h* at the other end in the stacking direction (lower end in the figure) to the fifth power generation cell 153*e* to a center through the seventh and sixth power generation cells 153*g* and 153*f*.

Specifically, for example, to explain the top fuel cell stack 155*a* as an example, in order to supply air to an air flow path 163*a* of the outermost first power generation cell 153*a*, the third insertion hole 161 and an inlet side (right side in the figure) of the air flow path 163*a* are connected by a communication hole (not shown) similar to the communication hole in Embodiment 1.

Further, an outlet side (left side in the figure) of the air flow path 163*a* of the first power generation cell 153*a* and an inlet side (left side in the figure) of an air flow path 163*b* of the second power generation cell 153*b* are connected by a vertical communication hole 165*a*. A lower end of the vertical communication hole 165*a* is closed so as not to communicate with a third power generation cell 153*c*.

Further, an outlet side of the air flow path 163*b* of the second power generation cell 153*b* and an inlet side of an air flow path 163*c* of the third power generation cell 153*c* is connected by a vertical communication hole 165*b*.

Also, an outlet side of the air flow path 163*c* of the third power generation cell 153*c* and an inlet side of an air flow path 163d of the fourth power generation cell 153d are connected by a vertical communication hole 165c.

Further, an outlet side of the air flow path 163d of the fourth power generation cell 153d and a fifth insertion hole 167 are connected by a communication hole that is similar to the communication hole in Embodiment 1 (but symmetrical to the first power generation cell 153a in its planar shape).

Air flow paths in the bottom fuel cell stack 155b are basically similar to the air flow paths in the top fuel cell stack 155a, and thus description thereof is omitted.

Other configurations, such as, for example, other insertion holes and fuel gas flow paths, are basically the same as those in Embodiment 1. Thus, description thereof is omitted b) Now, the air flow paths in the present embodiment will be described.

As shown in FIG. 8, air is introduced into the fuel cell stack 155, i.e., into the seventh insertion hole 159, in the stacking direction (vertical direction in FIG. 8) of the fuel cell stack 155 from an air inlet pipe 171.

Then, air is introduced into an interior (first flow path 174 including an opening 173) of the heat exchanger 157 from the seventh insertion hole 159.

Then, in the same manner as in Embodiment 1, heat exchange is performed between air and the upper and lower power generation cells 153, and air is heated in the heat exchanger 157.

Then, air having the increased temperature by heat exchange is introduced to the third insertion hole 161 (in a diagonal direction of the seventh insertion hole 159).

Then, air introduced to the third insertion hole 161 branches and is guided to the stacking direction (vertical direction in FIG. 8) along the third insertion hole 161, and introduced to the air flow paths 163a and 163h of the first and eighth power generation cells 153a and 153h at both ends of the top fuel cell stack 155a and bottom fuel cell stack 155b.

For example, in the top fuel cell stack 155a, as shown in FIG. 9, air used for power generation in a cathode of the first power generation cell 153a is introduced to the air flow path 163b of the second power generation cell 153b through the vertical communication hole 165a.

Then, air used for power generation in a cathode of the second power generation cell 153b is introduced to the air flow path 163c of the third power generation cell 153c through the vertical communication hole 165b.

Then, air used for power generation in a cathode of the third power generation cell 153c is introduced to the air flow path 163d of the fourth power generation cell 153d through the vertical communication hole 165c.

Air used for power generation in a cathode of the fourth power generation cell 153d is then discharged to the fifth insertion hole 167, and is discharged outside from the fifth insertion hole 167 via an air outlet pipe (not shown).

Air flow paths of the bottom fuel cell stack 155b are basically the same as the air flow path of the top fuel cell stack 155a, and flow paths for fuel gas are also the same as the fuel gas flow paths in Embodiment 1. Thus, description thereof is omitted.

c) In the present embodiment, the same effect as in Embodiment 1 is produced. In addition, air passing the interior (first flow path 174) of the heat exchanger 157 and heated by heat exchange is supplied to each of the power generation cells in the center from the first and eighth power generation cells 153a and 153h at the ends (having a temperature lower than the temperature in the center) in the stacking direction in turn. That is, because the first and eighth power generation cells 153a and 153h having a lowest temperature are effectively heated by air having a highest temperature, remarkable effect is achieved in which temperature distribution can be all the more equalized.

Embodiment 4

Next, Embodiment 4 will be described, but description of contents similar to the contents in Embodiment 1 will be omitted.

In a fuel cell of the present embodiment, air heated by heat exchange is temporarily moved out of a fuel cell stack, and then supplied to each power generation cell.

In the present embodiment, the first to eighth insertion holes are not used as air flow paths.

a) First, a structure of the fuel cell according to the present embodiment will be described.

Figure 10:
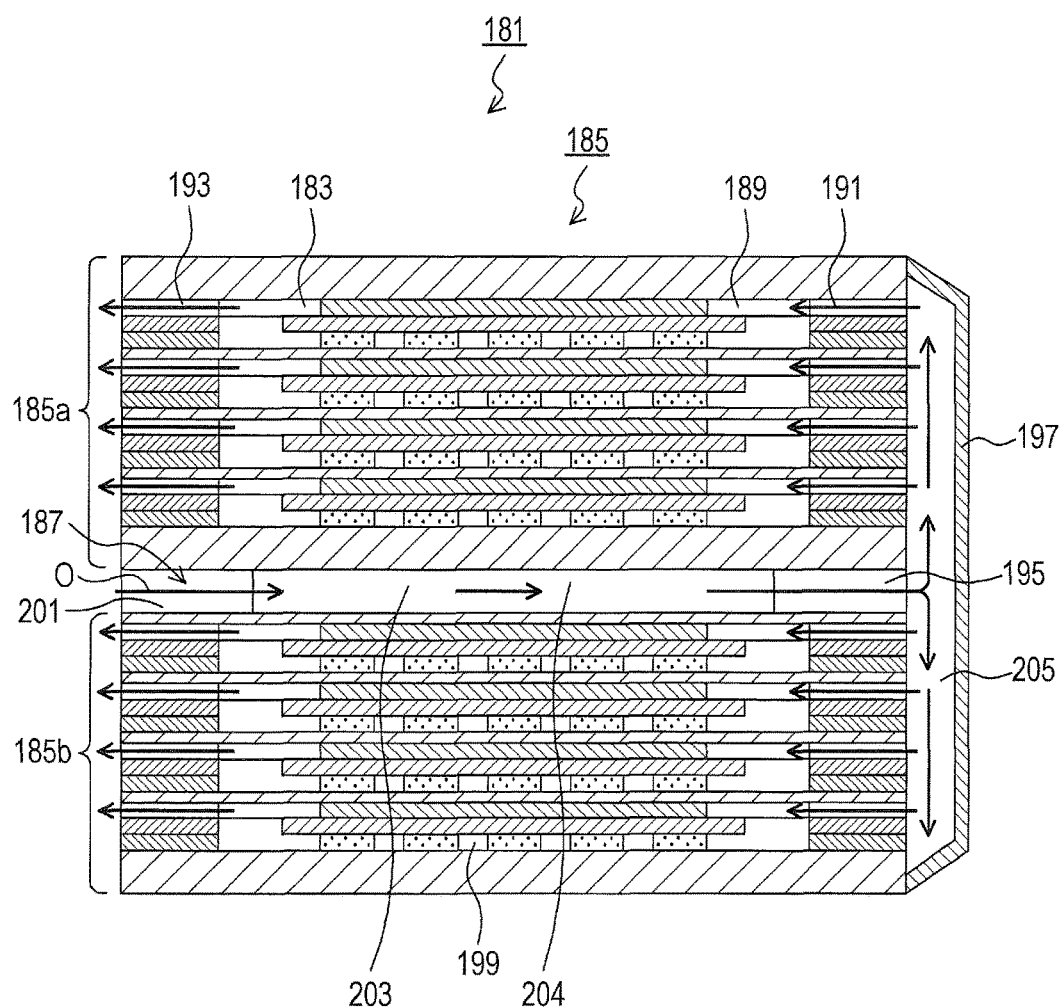
FIG. 10 is a cross-sectional view showing a state of a solid oxide fuel cell of Embodiment 4, taken in its stacking direction so as to include inlet and outlet flow paths for air in the fuel cell.

As shown in FIG. 10, the fuel cell 181 of the present embodiment is provided with a fuel cell stack 185 including eight planar power generation cells 183 (similar to the power generation cells in Embodiment 1) that are stacked one another. In a center in a stacking direction of the fuel cell stack 185, a planar heat exchanger 187 similar to the heat exchanger of Embodiment 1 is disposed. That is, the heat exchanger 187 is disposed between a top fuel cell stack 185a and a bottom fuel cell stack 185b.

Especially, in the present embodiment, an air inlet 191 is provided on one side (right side in the figure) of an air flow path 189 of each of the power generation cells 183, and an air outlet 193 is provided on the other side (left side in the figure).

In addition, on one side (right side in the figure) of side surfaces of the (cuboid) fuel cell stack 185, a bowl-shaped cover member 197 is disposed so as to cover an air outlet 195 of the heat exchanger 187 and the air inlets 191 of all the power generation cells 183.

It should be noted that a fuel gas flow path 199 of each of the power generation cells 183 is provided in a plane direction of the figure.

b) Now, the air flow paths in the present embodiment will be described.

As shown in FIG. 10, air is introduced from an air inlet 201 (left side in the figure) of the heat exchanger 187 into an interior (first flow path 204 including an opening 203) of the heat exchanger 187.

Then, in the same manner as in Embodiment 1, heat exchange is performed between air and the upper and lower power generation cells 183 in the heat exchanger 187. The power generation cells 183 are cooled, and the air is heated.

Then, air having the increased temperature by heat exchange is introduced from the outlet 195 into a communication space 205 that is a second flow path covered with the cover member 197.

Then, air introduced to the communication space 205 branches and is guided to the stacking direction (vertical direction in FIG. 10), and is introduced to the air flow path 189 through the inlet 191 of each of the power generation cells 183 of the top fuel cell stack 185a and the bottom fuel cell stack 185b.

Air used for power generation at a cathode of each of the power generation cells 183 is then discharged outside from the outlet 193.

It is only necessary that fuel gas is supplied to the plane direction of the figure. For example, the same flow path as the fuel gas flow path of Embodiment 1 can be used.

c) In the present embodiment, the same effect as in Embodiment 1 is produced. Further, because the communication space 205 formed by covering a side of an outer side of the fuel cell stack 185 with the cover member 197 is used, there is an advantage that an internal structure of the fuel cell stack 185 can be simplified.

Embodiment 5

Next, Embodiment 5 will be described. However, description of contents similar to the contents of Embodiment 1 will be omitted.

In a fuel cell of the present embodiment, fuel gas heated by heat exchange is temporarily moved out of the fuel cell stack and is then supplied to each power generation cell.

In the present embodiment, the first to eight insertion holes are not used as fuel gas flow paths.

a) First, a structure of the fuel cell according to the present embodiment will be described.

Figure 11:
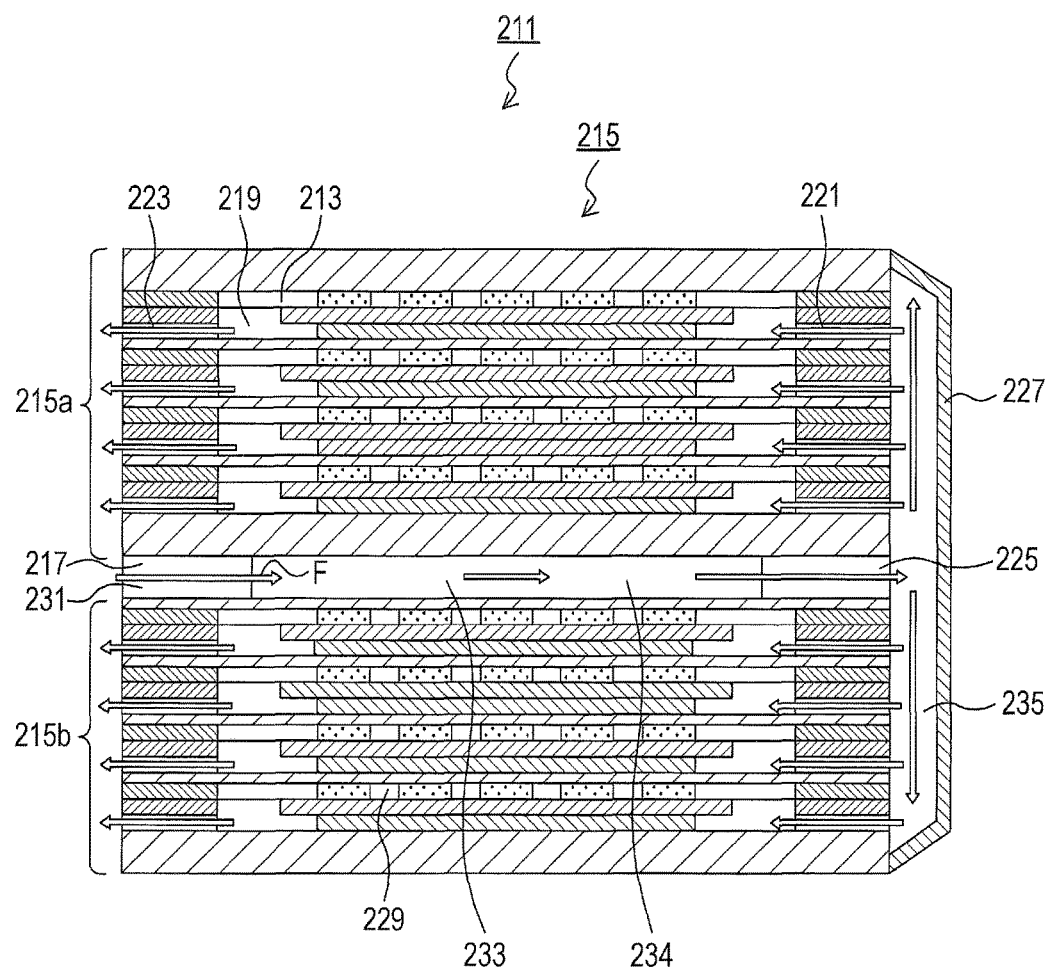
FIG. 11 is a cross-sectional view showing a state of a solid oxide fuel cell of Embodiment 5, taken in its stacking direction so as to include inlet and outlet flow paths for fuel gas in the fuel cell.

As shown in FIG. 11, the fuel cell 211 of the present embodiment is provided with a fuel cell stack 215 including eight planar power generation cells 213 (similar to the power generation cells in Embodiment 1) that are stacked one another. In a center in a stacking direction of the fuel cell stack 215, a planar heat exchanger 217 similar to the heat exchanger in Embodiment 1 is arranged. That is, the heat exchanger 217 is disposed between a top fuel cell stack 215$a$ and a bottom fuel cell stack 215$b$.

Particularly, in the present embodiment, an inlet 221 for fuel gas is provided on one side (right side in the figure) of the fuel gas flow path 219 of each of the power generation cells 213 and an outlet 223 for fuel gas is provided on the other side (left side in the figure).

In addition, on one side (right side in the figure) of side surfaces of the (cuboid) fuel cell stack 215, a bowl-shaped cover member 227 is disposed so as to cover an outlet 225 for fuel gas of the heat exchanger 217 and inlets 221 for fuel gas of all the power generation cells 213.

An air flow path 229 of each of the power generation cells 213 is provided in a plane direction of the figure.

b) Now, the fuel gas flow paths in the present embodiment will be described.

As shown in FIG. 11, fuel gas is introduced from an inlet 231 (left side in the figure) for fuel gas of the heat exchanger 217 into an interior (first flow path 234 including an opening 233) of the heat exchanger 217.

Then, in the same manner as in Embodiment 1, heat exchange is performed between fuel gas and the upper and lower power generation cells 213 in the heat exchanger 217. The power generation cells 213 are cooled, and fuel gas is heated.

Then, fuel gas having the increased temperature by heat exchange is introduced from the outlet 225 into a communication space 235 that is a second flow path covered with the cover member 227.

Then, fuel gas introduced to the communication space 235 branches and is guided to the stacking direction (vertical direction in FIG. 11), and is introduced to the fuel gas flow path 219 via the inlet 221 of each of the power generation cells 213 of the top fuel cell stack 215$a$ and the bottom fuel cell stack 215$b$.

Fuel gas used for power generation in an anode of each of the power generation cells 213 is discharged outside from the outlet 223.

It is only necessary that air is supplied to the plane direction of the figure. For example, a flow path similar to the fuel gas flow path of Embodiment 1 can be used.

c) In the present embodiment, the same effect as in Embodiment 1 is produced. Also, because the communication space 235 formed by covering a side of an outer side of the fuel cell stack 215 with the cover member 227 is used as the fuel gas flow path, there is an advantage that an internal structure of the fuel cell stack 215 can be simplified.

Embodiment 6

Next, Embodiment 6 will be described. However, description of contents similar to the contents of Embodiment 1 will be omitted.

A fuel cell of the present embodiment is only different in internal structure of the heat exchanger. Therefore, only the difference will be described.

Figure 12:
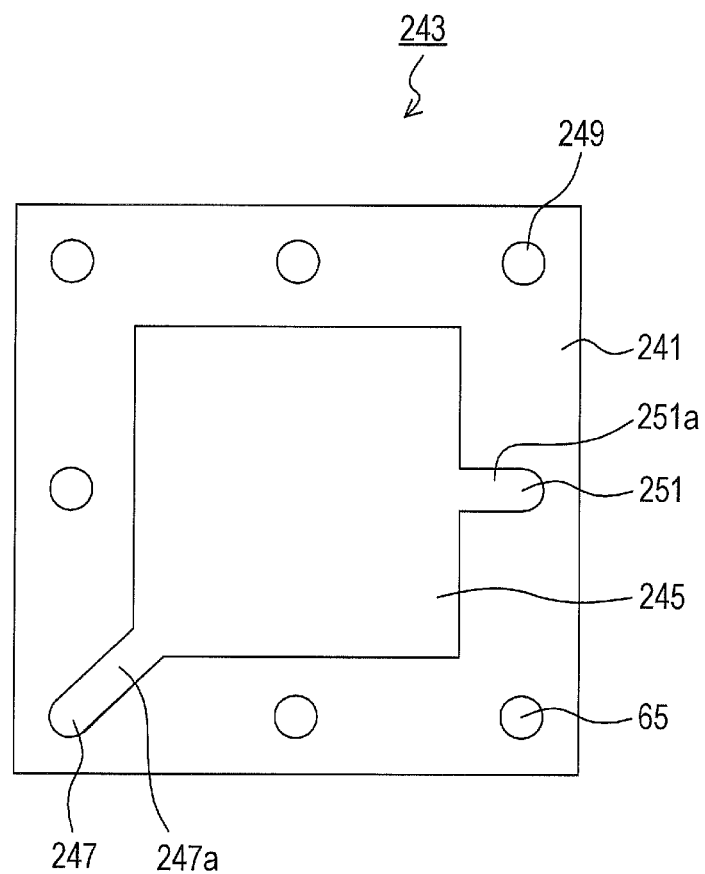
FIG. 12 is an explanatory diagram showing a flow path in a heat exchanger of a solid oxide fuel cell of Embodiment 6 seen from a planar direction.

In the present embodiment, as shown in a heat exchanger frame 241 in FIG. 12, an air flow path in an interior (opening 245) of a heat exchanger 243 is configured to reach not a third insertion hole 249 in a diagonal direction but a fourth insertion hole 251 next to the third insertion hole 249, from a seventh insertion hole 247 that introduces air.

That is, the "first flow path" of the present invention includes the opening 245, a communication hole 251$a$ that communicates with the opening 245 and the fourth insertion hole 251, and a communication hole 247$a$ that communicates with the opening 245 and the seventh insertion hole 247. The fourth insertion hole 251 (outlet) is arranged in "vicinity" of a farthest position (position of the third insertion hole 249) from the seventh insertion hole 247 (inlet).

In the heat exchanger frame portion 241, a plurality of other insertion holes, such as the insertion hole 65, are formed.

In the present embodiment as well, substantially the same effect as in Embodiment 1 is produced.

Embodiment 7

Next, Embodiment 7 will be described. However, description of contents similar to the contents of Embodiment 1 will be omitted.

In a fuel cell according to the present embodiment, a heat exchanger is provided with a first oxidant gas (air) flow path and a first fuel gas flow path separately.

a) First, a heat exchanger used in the present embodiment will be described.

Figure 13:
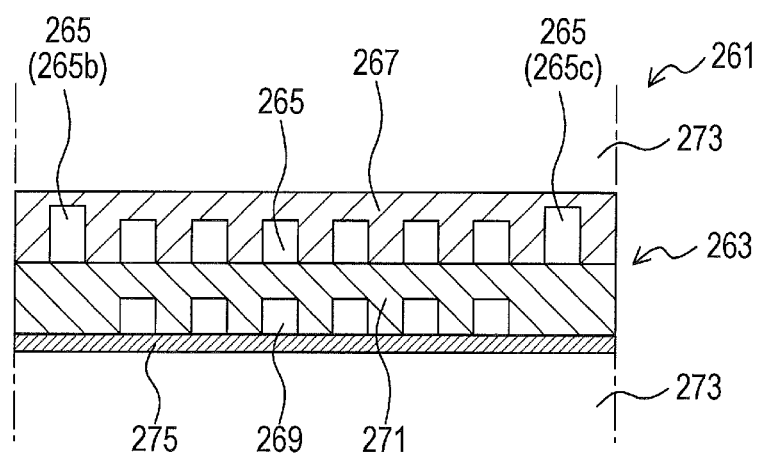
FIG. 13 is an explanatory view schematically showing a heat exchanger of a solid oxide fuel cell of Embodiment 7, taken in its thickness direction.

As schematically shown in FIG. 13, a heat exchanger 263 used in the fuel cell 261 of the present embodiment is a plate-like member that includes a plate-like member 267 for air having first grooves 265 that are air flow paths (first air flow paths) and a plate-like member 271 for fuel gas having second grooves 269 that are fuel gas flow paths (first fuel gas flow paths). The member 267 for air and the member 271 for fuel gas are stacked in a stacking direction (thickness direction) of power generation cells 273.

That is, the member 267 for air and the member 271 for fuel gas of the heat exchanger 263 are stacked so that the first grooves 265 of the member 267 for air and the second grooves 269 of the member 271 for fuel gas are on the same side in the stacking direction (lower section of FIG. 13), and are integrally joined, for example, by brazing.

In addition, to the second groove 269 side of the member 271 for fuel gas, an inter-connector 275 of the adjacent power generation cell 273 is joined, for example, by brazing, so as to cover an open side of the second grooves 269.

In this fuel cell, a flow rate of air is generally greater than a flow rate of fuel gas. Thus, in order to increase a size of the air flow paths, a depth of the first grooves 265 (which are air flow paths) is set greater as a whole than a depth of the second grooves 269 (which are fuel gas flow paths). In addition, at portions of the first grooves 265, i.e., an inlet portion (first inlet groove 265b) and an outlet portion (first outlet groove 265c) to and from the first air groove 265 respectively shown in left and right ends of FIG. 13, the depth of the first grooves 265 is set to be all the more greater (the same applies to embodiments below). The reason for increasing the depth of the inlet portion and the outlet portion to and from the first air grooves 265 is because the flow rate of air per unit cross-sectional area is greatest in the inlet portion and the outlet portion.

It should be noted that the first grooves 265 of the member 267 for air and the second grooves 269 of the member 271 for fuel gas can be formed, for example, by cutting.

Now, the flow paths of the heat exchanger 263 will be described in detail.

As shown FIGS. 14A and 14B, the member 267 for air is provided with first to eighth insertion holes 281 to 288 in its circumference (square frame portion 277 along an outer circumference), in the same manner of arrangement as in Embodiment 1. The third insertion hole 283 is a flow path for introducing air to the first grooves 265, and the eighth insertion hole 288 is a flow path for discharging air from the first grooves 265.

In addition, the first grooves 265 are provided on one side (under side: see FIG. 14B) of a thickness direction of the member 267 for air. The first grooves 265 include a center groove 265a formed in a center portion (i.e., inside the frame portion 277) of the member 267 for air, a first inlet groove 265b that makes the center groove 265a in communication with the third insertion hole 283, and a first outlet groove 265c that makes the center groove 265a in communication with the eighth insertion hole 288.

In the center groove 265a, a plurality of protrusions 266 having a square shape in plan view (shape of quadrangular prism) are formed, so that the center groove 265a is not buried by adjacent members, and that a height of the protrusions 266 is the same as a depth of the center groove 265a. The protrusions 266 are arranged so that their longitudinal directions are aligned in a horizontal direction of FIG. 14B, in order to guide a flow of air to an outlet side.

In the present embodiment, the protrusions having only one type of shape (square shape in plan view) are arranged, but the shape is not limited thereto. For example, the shape of the protrusions may be a cube shape, cuboid shape, frustum shape, other prismatic shape or any other shapes. Also, a mixture of protrusions each having a different kind of shape and dimension may be arranged. In addition, in the present embodiment, all the protrusions are arranged to be aligned, but the arrangement is not limited thereto. It is only necessary that the flow of air is guided to the outlet side. That is, a part of the protrusions may be oriented differently from other protrusions, for example, may be obliquely oriented. The same applies to shapes and arrangements of protrusions in other embodiments, hereinbelow.

On the other hand, as shown FIGS. 14C and 14D, the member 271 for fuel gas is provided with the first to eighth insertion holes 281 to 288 in its circumference, in the same manner of arrangement as in Embodiment 1 (as for reference numbers of the first to eighth insertion holes, the same numbers as the reference numbers for the member for air are used). It should be noted that the first insertion hole 281 is a flow path for introducing fuel gas to the second grooves 269, and the sixth insertion hole 286 is a flow path for discharging fuel gas from the second grooves 269.

In addition, the second grooves 269 are provided on one side (under side: see FIG. 14D) in a thickness direction of the member 271 for fuel gas. The second grooves 269 include a center groove 269a that is formed in a center portion of the member 271 for fuel gas, a second inlet groove 269b that makes the center groove 269a in communication with the first insertion hole 281, and a second outlet groove 269c that makes the center groove 269a in communication with the sixth insertion hole 286.

In the center groove 269a, a plurality of protrusions 270, each having a square shape in plan view (shape of quadrangular prism), are formed so that the center groove 269a is not buried by adjacent members, and that a height of the protrusions 270 is the same as a depth of the center groove 269a. The protrusions 270 are arranged so that their longitudinal directions are aligned in a vertical direction of FIG. 14D, in order to guide a flow of fuel gas to an outlet side. That is, the protrusions 266 of the member 267 for air and the protrusions 270 of the member 271 for fuel gas are arranged in directions perpendicular to each other in plan view.

b) Next, the fuel cell 261 provided with the heat exchanger 263 will be described.

Figure 15A:
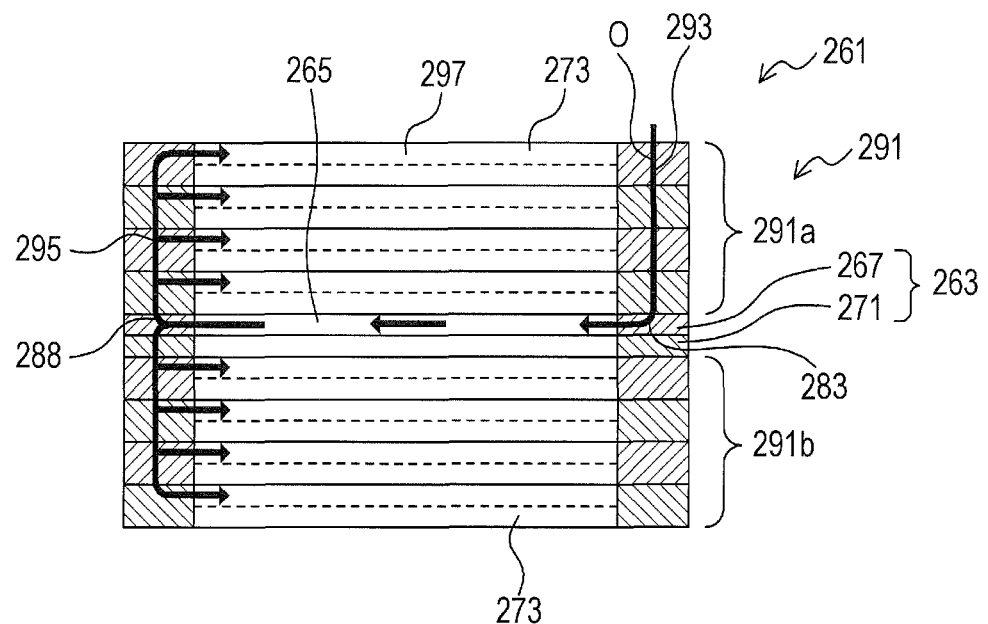
FIG. 15A is an explanatory diagram showing an air flow path in a stacking direction (vertical direction) of the solid oxide fuel cell of Embodiment 7.
Figure 15B:
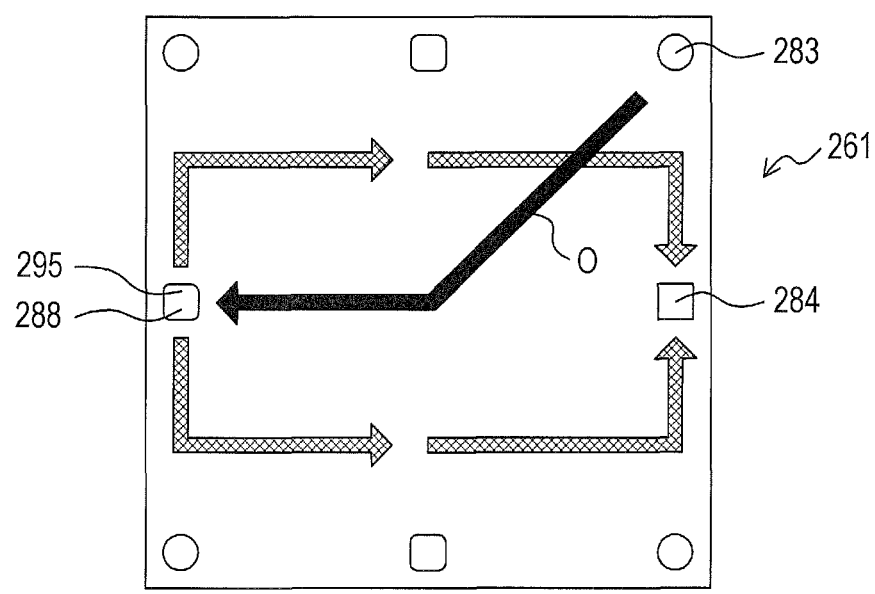
FIG. 15B is an explanatory diagram showing an air flow path in a planar direction of the solid oxide fuel cell.

As schematically shown in FIGS. 15A and 15B, in the fuel cell 261 of the present embodiment, the heat exchanger 263 is disposed in a center portion in a stacking direction of a fuel cell stack 291, i.e., between a top fuel cell stack 291a and a bottom fuel cell stack 291b, in the same manner as in Embodiment 1.

In detail, for example, four of the power generation cells 273 are stacked on one side (upper section of FIG. 15A) of the heat exchanger 263 including a stack of the member 267 for air and the member 271 for fuel gas, and, for example, four of the power generation cells 273 are stacked on the other side (lower section of FIG. 15A) of the heat exchanger 263.

In the present embodiment, in the same manner as in Embodiment 1, an air inlet flow path 293 that is formed to extend in the stacking direction in an interior of the fuel cell 261 is provided in an outer peripheral portion of the fuel cell 261. The air inlet flow path 293 communicates with the third insertion hole 283 of the member 267 for air.

Thus, as shown in FIG. 15A, air that is introduced to the third insertion hole 283 of the member 267 for air is heated (by heat exchange) when passing through the first grooves 265 that are first air flow paths. Thereafter, the heated air is discharged through the eighth insertion hole 288 to a second air flow path 295 (formed so as to extend in the stacking direction in the interior of the fuel cell 261) that is similar to the flow path in Embodiment 1, and is supplied to an air flow path 297 of each of the power generation cells 273 from the second air flow path 295. Then, air is discharged outside in the same manner as in Embodiment 1 above.

In FIG. 15B, a flow of air when viewed from the stacking direction is schematically shown. It should be noted that, the heated air passing through the member 267 for air from third insertion hole 283 and supplied to the eighth insertion hole 288 passes through the second flow path 295, is introduced to the air flow path 297 through a predetermined flow path (elongated through hole: not shown) in each of the power generation cells 273, and is discharged outside from the fourth insertion hole 284. The flow of air in the power generation cells 273 is indicated by meshed arrows.

Figure 16A:
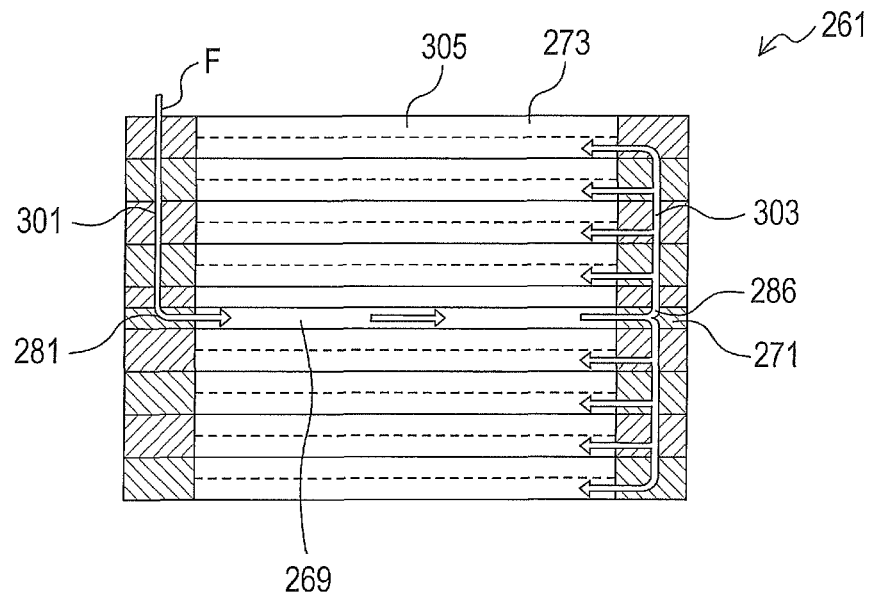
FIG. 16A is an explanatory diagram showing a fuel gas flow path in a stacking direction (vertical direction) of the solid oxide fuel cell of Embodiment 7.
Figure 16B:
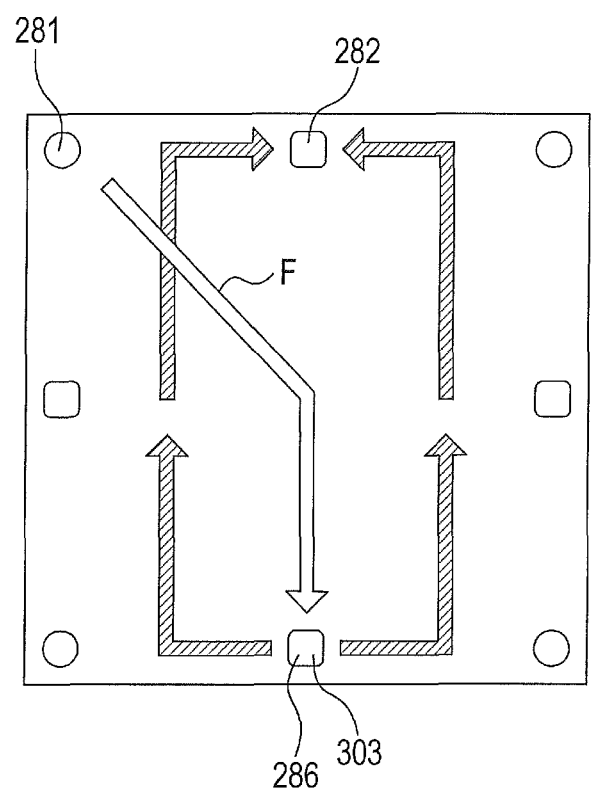
FIG. 16B is an explanatory diagram showing a fuel gas flow path in a planar direction of the solid oxide fuel cell.

On the other hand, as shown in the flow of fuel gas in FIGS. 16A and 16B, in the present embodiment, a fuel gas inlet flow path 301 that is formed so as to extend in the stacking direction in the interior of the fuel cell 261 is provided at the outer peripheral portion of the fuel cell 261. The fuel gas inlet flow path 301 is in communication with the first insertion hole 281 of the member 271 for fuel gas.

Thus, as shown in FIG. 16A, fuel gas introduced to the first insertion hole 281 of the member 271 for fuel gas is heated (by heat exchange) when passing through the second grooves 269 that are first fuel gas flow paths. Thereafter, the heated fuel gas is discharged to the second flow path 303 for fuel gas (which is formed so as to extend in the stacking direction in the interior of the fuel cell 261) through the sixth insertion hole 286, and is then supplied to a fuel gas flow path 305 of each of the power generation cells 273 from the second flow path 303. Then, the gas is discharged outside in the same manner as in Embodiment 1 above.

FIG. 16B schematically shows the flow of fuel gas when viewed from the stacking direction. It should be noted that the heated fuel gas passing through the member 271 for fuel gas from the first insertion hole 281 and supplied to the sixth insertion hole 286 passes through the second flow path 303, is introduced to the fuel gas flow path 305 through a predetermined flow path (elongated through hole: not shown) in each of the power generation cells 273, and is discharged outside from the second insertion hole 282. The flow of air inside the power generation cells 273 is indicated by the hatched arrows.

c) As described above, in the present embodiment, the first grooves 265 that are first air flow paths and the second grooves 269 that are first fuel gas flow paths are provided in the heat exchanger 263 separately.

Therefore, when air and fuel gas cooler than the center portion of the fuel cell stack 291 are supplied to each of the first flow paths of the heat exchanger 263 from outside, air and fuel gas are heat exchanged with the adjacent power generation cells 273, and temperatures of air and fuel gas are raised, while temperatures of the adjacent power generation cells 273 are lowered. Then, air and fuel gas having the increased temperatures by heat exchange are supplied to the power generation cells 273 on the end sides of the stacking direction. Therefore, the temperatures of the power generation cells 273 to which air and fuel gas are supplied are raised by air and fuel gas. As a result, in the stacking direction of the fuel cell stack 291, the temperature in the center is lowered while the temperature on the end sides is raised. Thus, the temperature in the stacking direction is equalized.

That is, in the present embodiment, since heat exchange with both cool air and fuel gas is performed by the heat exchanger 263 disposed in the center having the high temperature, the temperature in the center can be more efficiently lowered, and the temperature at the end sides can be raised by supplying air and fuel gas having the increased temperatures by heat exchange to the end sides having the low temperature. Thereby, the temperature in the stacking direction of the fuel cell stack 291 is equalized. Significant effect of further improved power generation efficiency is achieved (as compared to Embodiment 1).

In addition, in the present embodiment, air and fuel gas supplied from outside are heated by the heat exchanger 263. Thus, there is an advantage that a device or the like for heating air and fuel gas in advance (preheating) can be eliminated.

Figure 17:
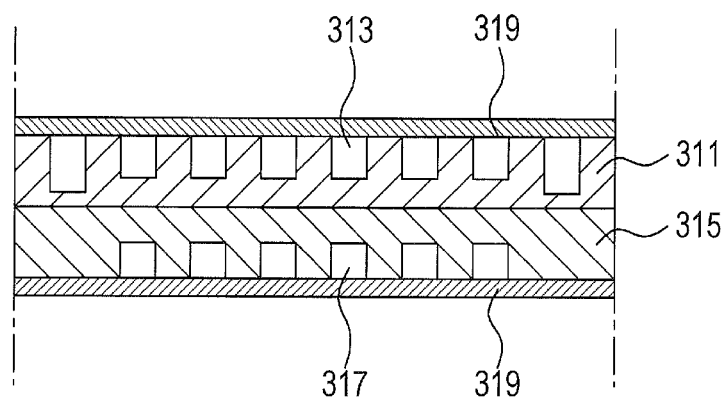
FIG. 17 is a modification of the solid oxide fuel cell of Embodiment 7, and is an explanatory diagram schematically showing its heat exchanger taken in its thickness direction.

In the present embodiment, the first grooves 265 of the member 267 for air and the second grooves 269 of the members 271 for fuel gas are provided on the same side in the stacking direction. As another example, for example, as shown in FIG. 17, first grooves 313 of a member 311 for air and second grooves 317 of a member 315 for fuel gas may be provided in opposite sides (top and bottom sides in the figure) in the stacking direction. In this case, inter-connectors 319 of the adjacent power generation cells 273 are joined, for example, by brazing so as to cover the first grooves 313 and the second grooves 317.

Embodiment 8

Next, Embodiment 8 will be described. Description of contents similar to the contents of Embodiment 7 above is omitted.

In the fuel cell of the present embodiment, a heat exchanger provided with a member for air and a member for fuel gas includes third grooves that form part of a first air flow path on the member for air side of the member for fuel gas.

Figure 18:
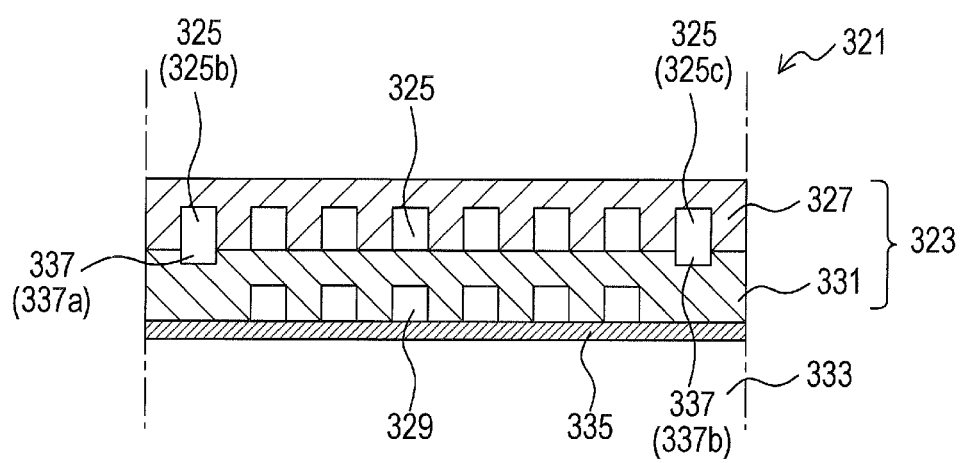
FIG. 18 is an explanatory view schematically showing a heat exchanger of a solid oxide fuel cell of Embodiment 8, taken in its thickness direction.

As schematically shown in FIG. 18, a heat exchanger 323 used in the fuel cell 321 of the present embodiment includes, as in Embodiment 7 above, a plate-like member 327 for air having first grooves 325 that are air flow paths (first air flow paths), and a plate-like member 331 for fuel gas having second grooves 329 that are fuel gas flow paths (first fuel gas flow paths). The member 327 for air and the member 331 for fuel gas are stacked in a stacking direction of power generation cells 333.

That is, the member 327 for air and member 331 for fuel gas of the heat exchanger 323 are stacked so that the first grooves 325 of the member 327 for air and the second grooves 329 of the member 331 for fuel gas are on the same side (lower section of FIG. 18) in the stacking direction and are integrally joined, for example, by brazing.

To the second groove 329 side of the member 331 for fuel gas, an inter-connector 335 of the adjacent power generation cell 333 is joined, for example, by brazing, so as to cover an open side of the second grooves 329.

In particular, in the present embodiment, on the member 327 for air side of the member 331 for fuel gas, third grooves 337 are formed so as to communicate with portions of the first grooves 325 of the member 327 for air. In other words, in portions of the air flow paths, i.e., at an inlet portion (first inlet groove 325b) and an outlet portion (first outlet groove 325c) of air to and from the first grooves 325 shown in left and right ends of FIG. 18, the first grooves 325 (325b, 325c) and the third grooves 337 (337a, 337b) respectively come together, and air flow paths having a larger cross-sectional area than the other first grooves 325 are formed.

The following describes in detail the flow paths of the above described heat exchanger 323.

As shown in FIGS. 19A and 19B, a shape of both sides of a thickness direction of the member 327 for air (thus, air flow path) is the same as the shape in Embodiment 7 above. Also, first to eighth insertion holes 341 to 348 are formed in the same manner.

On the other hand, as shown in FIGS. 19C and 19D, on a "member 327 for air" side (upper side: see FIG. 19C) of the member 331 for fuel gas, a third-a groove 337a that is one of the third grooves 337 is formed at an angle toward a center of the figure, so as to communicate with the third insertion hole 343.

The third-a groove 337a is formed so as to overlap with the first inlet groove 325b of the first groove 325 of the member 327 for air shown in FIG. 19B. Thereby, the third-a groove 337a and the first inlet groove 325b come together to form a flow path for (introduction of) air.

In order to form the third-a groove 337a on an upper side of the member 331 for fuel gas, a center groove 329a is not formed at a corresponding location (oblique portion 331a) on an under side of the member 331 for fuel gas (see FIG. 19D).

Further, as shown in FIG. 19C, on a "member 327 for air" side (upper side) of the member 331 for fuel gas, a third-b groove 337b that is another third groove 337 is formed in a lateral direction toward a center of the same figure so as to communicate with the eighth insertion hole 348.

The third-b groove 337b is formed so as to overlap with a first outlet groove 325c of the first grooves 325 of the member 327 for air shown in FIG. 19B. Thereby, the third-b groove 337b and the first outlet groove 325c come together to form a flow path for (discharge of) air.

In order to form the third-b groove 337b on an upper side of the member 331 for fuel gas, the center groove 329a is not formed at a corresponding location (protruding portion 331b) on an under side of the member 331 for fuel gas (see FIG. 19D).

In the present embodiment as well, the same effect as in Embodiment 7 above is achieved. Also, since the third grooves 337 that communicate with a portion of the first grooves 325 is formed on the upper side of the member 331 for fuel gas, there is an advantage that large air flow paths can be provided.

That is, in the present embodiment, significant effect can be obtained in which, while a depth of the air flow paths is secured, a thickness of the heat exchanger 323 can be reduced.

Embodiment 9

Next, Embodiment 9 will be described. Description of contents similar to the contents in Embodiment 7 is omitted.

In a fuel cell of the present embodiment, a single plate-like heat exchanger is provided with a first air flow path and a first fuel gas flow path on both sides of a thickness direction of the heat exchanger.

Figure 20:
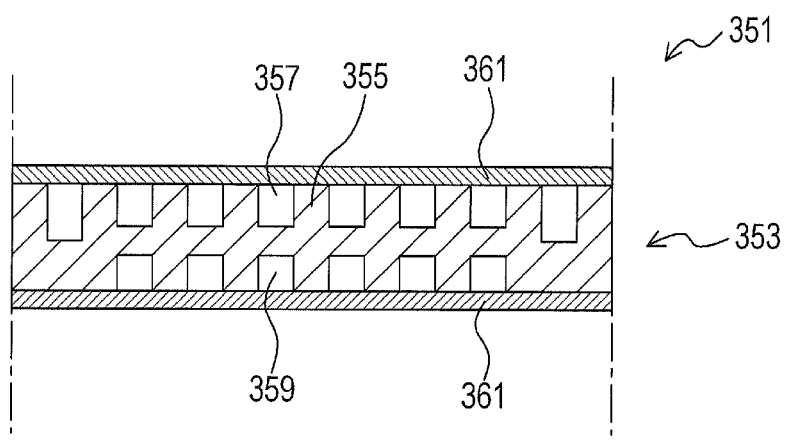
FIG. 20 is an explanatory view schematically showing a heat exchanger of a solid oxide fuel cell of Embodiment 9, taken in its thickness direction.

As schematically shown in FIG. 20, in a heat exchanger 353 used in a fuel cell 351 of the present embodiment, first grooves 357 that are air flow paths (first air flow paths) are formed on one side (upper side: upper section of the figure) of a single plate (plate member) 355, and second grooves 359 that are fuel gas flow paths (first fuel gas flow path) are formed on the other side (under side: lower section of the figure) of the plate member 355.

In addition, inter-connectors 361 of the adjacent power generation cells are joined, for example, by brazing so as to cover open sides of the first grooves 357 and the second grooves 359 of the plate member 355.

It should be noted that, as described above, since a flow rate of air is greater than a flow rate of fuel gas, a depth of the first grooves 357 (which are air flow paths) is set to be larger as a whole than a depth of the second grooves 359 (which are fuel gas flow paths). Also, in a portion (inlet portion to the first air grooves 357), the depth of the first grooves is set to be larger by reducing the depth of the second grooves 359.

The following describes in detail the flow paths of the above described heat exchanger 353.

Figure 21A:
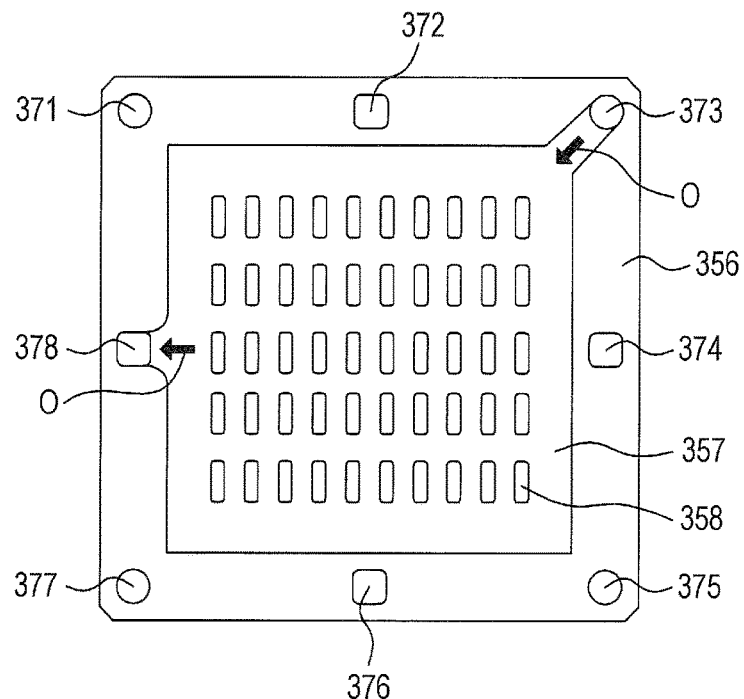
FIG. 21A is a plan view illustrating a front surface (top surface) of a plate-shaped member in Embodiment 9.
Figure 21B:
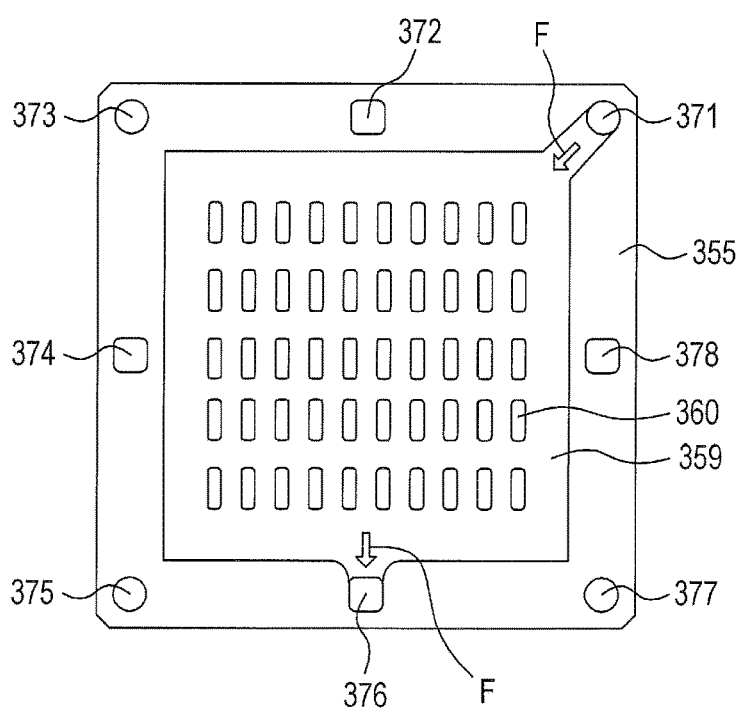
FIG. 21B is a plan view showing a back surface (under surface) of the plate-like member.

As shown in FIGS. 21A to 21B, the plate member 355 of the heat exchanger 353 has first to eighth insertion holes 371 to 378, as in Embodiment 7 above.

Then, as shown in FIG. 21A, on an upper side of the plate member 355, first grooves 357 that communicate with the third insertion hole 373 (to which air is introduced) and with the eighth insertion hole 378 (from which air is discharged) are formed as air flow paths.

That is, a center portion (except for a square frame portion 356 of a peripheral portion) on the upper side of the plate member 355 is cut into a square shape excluding protrusions 358 having a square shape in plan view (shape of a quadrangular prism), to form the air flow paths (first grooves 357).

On the other hand, as shown in FIG. 21B, on an under side of the plate member 355, second grooves 359 that communicate with a first insertion hole 371 (to which fuel gas is introduced) and a sixth insertion hole 376 (from which fuel gas is discharged) is formed as fuel gas flow paths.

In other words, in the same manner as in the upper side, a center portion on the under side of the plate member 355 is cut into a square shape except for protrusions 360 having a square shape in plan view (shape of a quadrangular prism), to form the fuel gas flow paths (second grooves 359).

In this way, the present embodiment produces the same effect as in Embodiment 7 above. Also, since the first grooves 357 and the second grooves 359 are formed on opposite side of the plate member 355, there is an advantage that the heat exchanger 353 can be reduced in size (thin).

In addition, since the first flow path of each gas is formed by forming grooves 357 and 359 on both sides of the plate member 355, there is effect in which its structure can be simplified, and thus its manufacturing can be easier and costs can be reduced.

In addition, because heat capacity of the heat exchanger 353 (therefore the fuel cell 351) can be reduced, significant effect is achieved in improvement in starting.

Embodiment 10

Next, Embodiment 10 will be described. Description of contents similar to the contents of Embodiment 7 is omitted.

A fuel cell of the present embodiment uses a plurality of the heat exchangers used in Embodiment 7 above.

Figure 22:
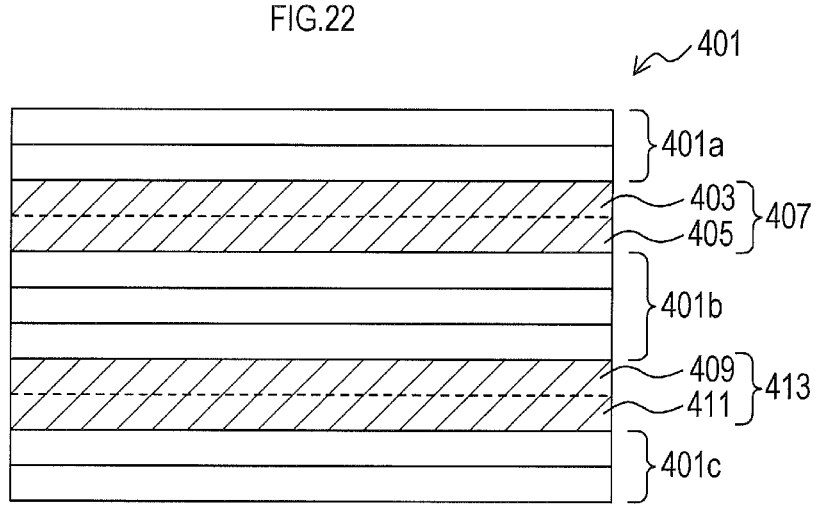
FIG. 22 is an explanatory diagram schematically showing an arrangement of a heat exchanger in a solid oxide fuel cell of Embodiment 10.

Specifically, as shown in FIG. 22, in a stacking direction of a fuel cell stack 401, heat exchangers 407 and 413 that are similar to the heat exchanger in Embodiment 7 are separately arranged at different locations.

For example, the heat exchanger 407 constituted by a member 403 for air and a member 405 for fuel gas is disposed between a top fuel cell stack 401a and an intermediate fuel cell stack 401b, and another heat exchanger 413 constituted by a member 409 for air and a member 411 for fuel gas is disposed between the intermediate fuel cell stack 401b and a bottom fuel cell stack 401c.

According to the present embodiment as well, the same effect is obtained as in Embodiment 7 above. Also, because the plurality of heat exchanges 413 and 407 are used, there is an advantage of high efficiency of heat exchange.

It should be noted that, instead of the heat exchanger similar to the heat exchanger of Embodiment 7 above, the heat exchangers described in Embodiments 8 and 9 above may be used. Also, three or more heat exchangers may be used.

Embodiment 11

Next, Embodiment 11 will be described. Description of contents similar to the contents of Embodiment 7 is omitted.

In a fuel cell of the present embodiment, the member for air and the member for fuel gas of the heat exchanger used in Embodiment 7 above are separately used.

Figure 23A:
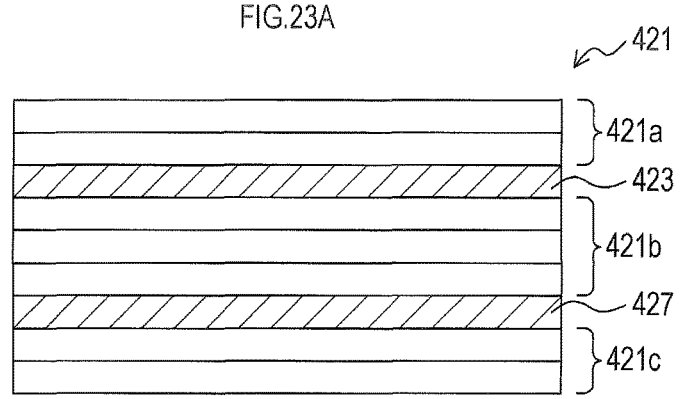
FIG. 23A is an explanatory diagram schematically showing an arrangement of a member for air and a member for fuel gas of a heat exchanger in a solid oxide fuel cell of Embodiment 11.

In particular, as shown in FIG. 23A, a member 423 for air and a member 427 for fuel gas are disposed at different positions in a stacking direction of a fuel cell stack 421.

For example, in the fuel cell stack 421, the member 423 for air is disposed between a top fuel cell stack 421a and an intermediate fuel cell stack 421b, and the member 427 for fuel gas is disposed between the intermediate fuel cell stack 421*b* and a bottom fuel cell stack 421*c*.

Figure 23B:
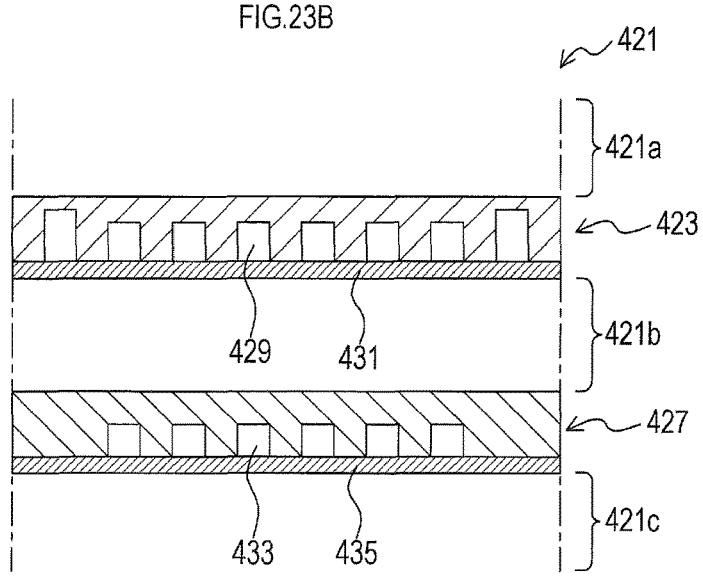
FIG. 23B is an explanatory diagram schematically showing the member for air and the member for fuel gas, taken in their thickness direction.

In addition, as shown in FIG. 23B of an enlarged main portion, an open side (lower section of the figure) of first grooves 429 of the member 423 for air is closed by an adjacent inter-connector 431. Similarly, an open side (lower section of the figure) of the second grooves 433 of the member 427 for fuel gas is closed by another adjacent inter-connector 435.

According to the present embodiment as well, the same effect as in Embodiment 7 is obtained.

In addition, the open sides of the first grooves 429 and the second grooves 433 can be either above or below. Also, two or more of the member 423 for air and the member 427 for fuel gas may be used.

Figure 23C:
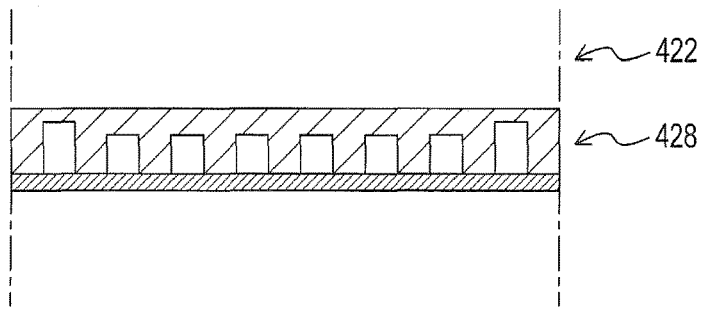
FIG. 23C is an explanatory diagram schematically showing another member for air, taken in its thickness direction.

Further, rather than using both the member 423 for air and the member 427 for fuel gas, as described above, only the member 428 for air may be used for the fuel cell stack 422, for example, as shown in FIG. 23C. In particular, since air supplied to the fuel cell stack 422 is greater than fuel gas, sufficient effect as a heat exchanger can be obtained using only the member 428 for air. In addition, by using a plurality of the members 428 for air, all the more significant effect can be obtained.

Although not shown, one or more of only the members for fuel gas may be used.

Embodiment 12

Next, Embodiment 12 will be described. Description of contents similar to the contents of Embodiment 1 above will be omitted.

The present embodiment illustrates a gas flow path (by bolts and insertion holes) that can be applied to the embodiments described above.

a) In the present embodiment, for example, as shown in FIG. 24A, in a fuel cell stack 445 (similar to the fuel cell stack in Embodiment 1) in which a heat exchanger 443 is disposed at a center of stacked power generation cells 441, a plurality of insertion holes 447 are provided so as to penetrate a stacking direction of the power generation cells 441, and bolts 449 are inserted to the insertion holes 447. The bolts 449 are screwed into nuts 455 and 457 through spacers 451 and 453 (having a function of sealing gas) at both ends so as to tighten and fix the fuel cell stack 445.

The bolt 449 is a solid rod. On a tip end (same figure) side of the bolt 449, a groove 459 is formed which reaches the insertion hole 447 from the tip end in an axial direction. In addition, the nut 455 (upper section of the figure) has a through hole 461 that is a gas flow path in the axial direction. Further, by the spacers 451 and 453, a cylindrical space 463 that is a gas flow path is formed between of an outer peripheral surface of the bolt 449 and an inner peripheral surface of the insertion hole 447.

Thus, for example, gas (e.g., oxidant gas) introduced from the through hole 461 of the nut 455 is introduced to the cylindrical space 463 through the groove 459 of the bolt 449, and is introduced to the heat exchanger 443 (through a not shown inlet) from the cylindrical space 463.

b) Further, a configuration shown in FIG. 24B can also be used as a variation.

In this variation, in the same manner as in the embodiment above, a bolt 475 is inserted to an insertion hole 473 of a fuel cell stack 471, and nuts 477 and 479 are screwed into the bolt 475 to tighten and fix the fuel cell stack 471.

The bolt 475 is a hollow rod. In an axial center of the bolt 475, a center hole 481 is formed which reaches from a tip end (upper section of the figure) to a lower portion. The center hole 481 is opened at a tip end side, and is closed at a back end side. Also, in its center portion, a plurality of transverse holes 483 that laterally open are provided.

In addition, the nut 477 (upper section of the figure) has a through hole 485 serving as a gas flow path in an axial direction. The through hole 485 communicates with the center hole 481 of the bolt 475.

In addition, a cylindrical space 487 serving as a gas flow path is formed between an outer peripheral surface of the bolt 475 and an inner peripheral surface of the insertion hole 473.

Thus, for example, gas (oxidant gas, for example) introduced from the through hole 485 of the nut 477 is introduced to the cylindrical space 487 from the horizontal holes 483 through the center hole 481 of the bolt 475, and is then introduced to the heat exchanger 489 from the cylindrical space 487 (via a not shown inlet).

Also in a case of introducing fuel gas to the heat exchanger in other embodiments, the configurations of the above described embodiments and variations can be used. Otherwise, the configuration of the gas flow path using the above described cylindrical space can be also used in a case of introducing each gas from the heat exchanger into each power generation cell or of discharging each gas discharged outside from the power generation cell.

Here, correspondence between wordings in the claims and the above described embodiments will be explained.

The bolts correspond to an example of the insertion member, the first groove and the second groove correspond to an example of the grooves, and the member for air corresponds to an example of the oxidant gas member.

Although the embodiments of the present invention have been described in the above, the present invention is not limited to the above described embodiments, and can take various modes.

(1) For example, the present invention can be applied to a fuel cell such as a solid polymer fuel cell, in addition to a solid oxide fuel cell.

In other words, in the above embodiment, a solid electrolyte layer (solid oxide) is described as an example of the electrolyte layer. However, the present invention is also applicable to a fuel cell using a solid polymer layer as the electrolyte layer, other than the solid electrolyte layer.

(2) Further, in the present invention, as the first flow paths in the heat exchanger, both or either of the flow paths for oxidant gas (e.g., air) and for fuel gas are provided. The configuration that can be employed as the flow path for oxidant gas can be employed as the configuration of the flow path for fuel gas, and vice versa.

For example, in Embodiment 1, the heat exchanger having the air flow path is described as an example. However, a heat exchanger having a fuel gas flow path, instead of the air flow path, may be used. In this case, a first flow path for fuel gas may be provided inside the heat exchanger, and a second flow path may be provided in the fuel cell stack.

Figure 25A:
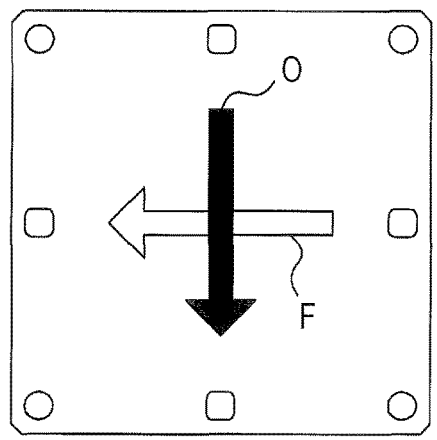
FIG. 25A is a plan view schematically showing a cross-flow of oxidant gas and fuel gas in a heat exchanger.
Figure 25B:
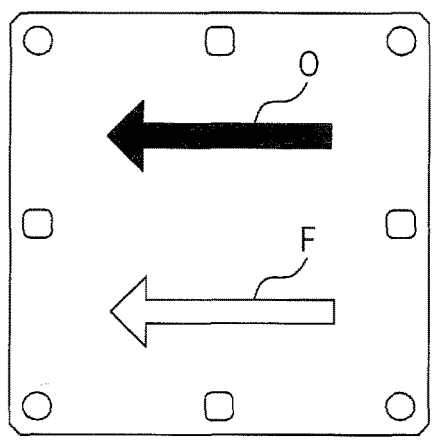
FIG. 25B is a plan view schematically showing a co-flow of each of the gases.
Figure 25C:
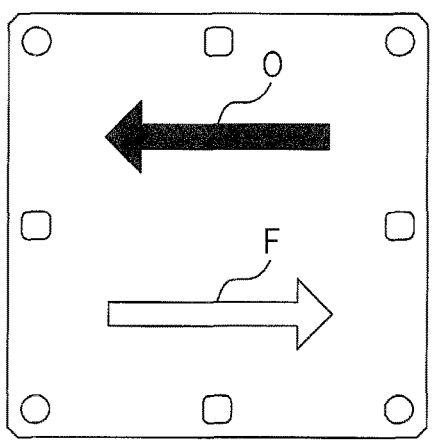
FIG. 25C is a plan view schematically showing a counter-flow of each of the gases.

(3) Further, in a case of providing the first flow path for oxidant gas and the first flow path for fuel gas in the heat exchanger, for example, a cross-flow (flow that crosses) shown in FIG. 25A, co-flow (parallel flow) shown in FIG. 25B, and counter flow (flow that opposes) shown in FIG. 25C, when viewed from the stacking direction, can be employed as the flow of each gas.

(4) The cross-sectional views in the drawings, such as in FIG. 5, only schematically show the thickness of the fuel cell of the present embodiment. Also, for example, the thickness of each structural member (inter-connector 43, 43a, 43b) in the cross-sectional view is not limited to the ratio of the thickness in each drawing.

The invention claimed is:

1. A fuel cell comprising:
a fuel cell stack in which a plurality of planar power generation cells are stacked in a thickness direction of the power generation cell, each of the plurality of planar power generation cells including an electrolyte layer, and a cathode and an anode disposed so as to sandwich the electrolyte layer therebetween, and generating electric power using oxidant gas and fuel gas;
a heat exchanger provided between the two adjacent power generation cells in the stacking direction and in contact with the power generation cells, the heat exchanger including therein a first flow path that passes the oxidant gas or fuel gas supplied from outside; and
a second flow path, an inlet of the second flow path being connected only to an outlet side of the first flow path in the heat exchanger and an outlet of the second flow path being connected only to the cathode side or the anode side of each of the power generation cells, the second flow path supplying all of the oxidant gas or fuel gas that has passed through the first flow path only to the cathode side or the anode side of each of the power generation cells, the plurality of the power generation cells being provided on both sides in the stacking direction of the heat exchanger,
wherein the second flow path comprises a first end and a second end as both ends of the second flow path along the stacking direction,
wherein the fuel cell stack comprises a first stack end and a second stack end as both ends of the fuel cell stack along the stacking direction, and
wherein the first end and the second ends are located between the first stack end and the second stack end.

2. The fuel cell according to claim 1,
wherein the first flow path formed in the heat exchanger is formed so as to extend in a surface direction of the planar power generation cell.

3. The fuel cell according to claim 2,
wherein the first flow path of the heat exchanger is constituted by a groove formed on a surface of a plate-shaped member.

4. The fuel cell according to claim 1,
wherein the heat exchanger is arranged in a center portion of the fuel cell stack in the stacking direction.

5. The fuel cell according to claim 1,
wherein two or more heat exchangers are provided in different positions in the stacking direction.

6. The fuel cell according to claim 1,
wherein the first flow path of the heat exchanger has a pressure loss structure that regulates an outflow state of at least one of the oxidant gas and the fuel gas.

7. The fuel cell according to claim 1,
wherein an inlet and an outlet of the first flow path where at least one of the oxidant gas and the fuel gas flows are formed in farthest positions from each other or in vicinity of the farthest positions, when the first flow path is viewed from the stacking direction.

8. The fuel cell according to claim 1,
wherein at least a portion of the second flow path is constituted by a flow path formed so as to extend in the stacking direction inside the fuel cell stack.

9. The fuel cell according to claim 8,
wherein the fuel cell stack has an insertion hole that penetrates the fuel cell stack in its thickness direction, an insertion member is inserted to the insertion hole, and at least a portion of the second flow path is formed between an inner peripheral surface of the insertion hole and an outer peripheral surface of the insertion member.

10. The fuel cell according to claim 8,
wherein the fuel cell stack has an insertion member that penetrates the fuel cell stack in its thickness direction, and at least a portion of the second flow path is formed in an interior of the insertion member.

11. A fuel cell comprising:
a fuel cell stack in which a plurality of planar power generation cells are stacked in a thickness direction of the power generation cell, each of the plurality of planar power generation cells including an electrolyte layer, and a cathode and an anode disposed so as to sandwich the electrolyte layer therebetween, and generating electric power using oxidant gas and fuel gas;
a heat exchanger provided between the two adjacent power generation cells in the stacking direction and in contact with the power generation cells, the heat exchanger including a first flow path for oxidant gas configured to pass the oxidant gas supplied from outside and a first flow path for fuel gas configured to pass fuel gas supplied from outside;
a second flow path for oxidant gas, an inlet of the second flow path for oxidant gas being connected only to an outlet side of the first flow path for oxidant gas of the heat exchanger and an outlet of the second flow path for oxidant gas being connected only to the cathode side of each of the power generation cells, the second flow path for oxidant gas configured to supply the oxidant gas that has passed through the first flow path for oxidant gas to the cathode side of each of the power generation cells on both sides in the stacking direction of the heat exchanger; and
a second flow path for fuel gas, an inlet of the second flow path for fuel gas being connected only to an outlet side of the first flow path for fuel gas of the heat exchanger and an outlet of the second flow path for fuel gas being connected only to the anode side of each of the power generation cells, the second flow path for fuel gas configured to supply fuel gas that has passed through the first flow path for fuel gas to the anode side of each of the power generation cells on both sides in the stacking direction of the heat exchanger.

12. The fuel cell according to claim 11,
wherein at least one of the first flow path for oxidant gas and the first flow path for fuel gas is formed so as to extend in a surface direction of the planar power generation cell.

13. The fuel cell according to claim 12,
wherein at least one of the first flow path for oxidant gas and the first flow path for fuel gas is constituted by a groove formed on a surface of a plate-shaped member.

14. The fuel cell according to claim 11,
wherein the heat exchanger is arranged in a center portion of the fuel cell stack in the stacking direction.

15. The fuel cell according to claim 11,
wherein two or more heat exchangers are provided in different positions in the stacking direction.

16. The fuel cell according to claim 11,
wherein the first flow path of the heat exchanger has a pressure loss structure that regulates an outflow state of at least one of the oxidant gas and the fuel gas.

17. The fuel cell according to claim 11,
wherein an inlet and an outlet of the first flow path where at least one of the oxidant gas and the fuel gas flows are formed in farthest positions from each other or in vicinity of the farthest positions, when the first flow path is viewed from the stacking direction.

18. The fuel cell according to claim 11,
wherein the heat exchanger is constituted by a plate-shaped member for oxidant gas that includes a first groove that is the first flow path for oxidant gas, and a plate-shaped member for fuel gas that includes a second groove that is the first flow path for fuel gas, the member for oxidant gas and the member for fuel gas being stacked in the stacking direction.

19. The fuel cell according to claim 18,
wherein the first groove of the member for oxidant gas is open to one side in the stacking direction, and the second groove of the member for fuel gas is formed so as to open to the other side in the stacking direction.

20. The fuel cell according to claim 18,
wherein both the first groove of the member for oxidant gas and the second groove of the member for fuel gas are formed so as to open to one side in the stacking direction.

21. The fuel cell according to claim 20,
wherein the member for fuel gas comprises a third groove, and the third groove is on an opposing side of the second groove and in communication with the first groove to form the first flow path for oxidant gas.

22. The fuel cell according to claim 11,
wherein the heat exchanger has the first groove for oxidant gas on one side in the stacking direction of a plate-shaped member, and the second groove for fuel gas on the other side in the stacking direction of the plate-shaped member.

23. The fuel cell according to claim 11,
wherein at least a portion of the second flow path is constituted by a flow path formed so as to extend in the stacking direction inside the fuel cell stack.

24. The fuel cell according to claim 23,
wherein the fuel cell stack has an insertion hole that penetrates the fuel cell stack in its thickness direction, an insertion member is inserted to the insertion hole, and at least a portion of the second flow path is formed between an inner peripheral surface of the insertion hole and an outer peripheral surface of the insertion member.

25. The fuel cell according to claim 23,
wherein the fuel cell stack has an insertion member that penetrates the fuel cell stack in its thickness direction, and at least a portion of the second flow path is formed in an interior of the insertion member.

26. A fuel cell comprising:
a fuel cell stack in which a plurality of planar power generation cells are stacked in a thickness direction of the power generation cell, each of the plurality of planar power generation cells including an electrolyte layer, and a cathode and an anode disposed so as to sandwich the electrolyte layer therebetween, and generating electric power using oxidant gas and fuel gas;
a heat exchanger provided between the two adjacent power generation cells in the stacking direction and in contact with the power generation cells, the heat exchanger including therein a first flow path that passes the oxidant gas or fuel gas supplied from outside; and
a second flow path, an inlet of the second flow path being connected only to an outlet side of the first flow path in the heat exchanger and an outlet of the second flow path being connected only to the cathode side or the anode side of each of the power generation cells, the second flow path supplying all of the oxidant gas or fuel gas that has passed through the first flow path only to the cathode side or the anode side of each of the power generation cells, the plurality of the power generation cells being provided on both sides in the stacking direction of the heat exchanger,
wherein the second flow path is disposed within the fuel cell stack so as not to extend beyond a first stack end and a second stack end of the fuel cell stack.

27. The fuel cell according to claim 26,
wherein the fuel cell comprises a bolt and a nut that secure the plurality of planar power generation cells with the heat exchanger.

28. The fuel cell according to claim 27,
wherein the fuel cell stack has an insertion hole that penetrates the fuel cell stack in its thickness direction, the bolt is inserted to the insertion hole, and at least a portion of the second flow path is formed between an inner peripheral surface of the insertion hole and an outer peripheral surface of the bolt.

29. The fuel cell according to claim 27,
wherein the fuel cell stack has an insertion hole that penetrates the fuel cell stack in its thickness direction, the bolt is inserted into the insertion hole, and at least a portion of the second flow path is formed in an interior of the bolt.

* * * * *